US012644428B2

(12) United States Patent
Tyler et al.

(10) Patent No.: US 12,644,428 B2
(45) Date of Patent: Jun. 2, 2026

(54) FLOW CONTROL METHOD, SYSTEM AND APPARATUS

(71) Applicant: G.W. Lisk Company, Inc., Clifton Springs, NY (US)

(72) Inventors: Jeffery A. Tyler, Newark, NY (US); David J. Trapasso, Bloomfield, NY (US); Zaccarie Peone, Seneca Falls, NY (US); Daniel Johnson, Wheeling, WV (US); Amanda Reid, Victor, NY (US)

(73) Assignee: G.W. Lisk Company, Inc., Clifton Springs, NY (US)

( * ) Notice: Subject to any disclaimer, the term of this patent is extended or adjusted under 35 U.S.C. 154(b) by 0 days.

(21) Appl. No.: 17/423,613

(22) PCT Filed: Jan. 17, 2020

(86) PCT No.: PCT/US2020/014124
§ 371 (c)(1),
(2) Date: Jul. 16, 2021

(87) PCT Pub. No.: WO2020/150624
PCT Pub. Date: Jul. 23, 2020

(65) Prior Publication Data

US 2022/0099050 A1 Mar. 31, 2022

Related U.S. Application Data

(60) Provisional application No. 62/865,609, filed on Jun. 24, 2019, provisional application No. 62/793,756, filed on Jan. 17, 2019.

(51) Int. Cl.
*F02M 21/02* (2006.01)
*F02M 69/18* (2006.01)

(52) U.S. Cl.
CPC ........ *F02M 21/0239* (2013.01); *F02M 69/18* (2013.01)

(58) Field of Classification Search
CPC ........................... F02M 21/0239; F02M 69/18
(Continued)

(56) References Cited

U.S. PATENT DOCUMENTS 2,894,829 A * 7/1959 Harrison ............ F02M 21/0239 48/184
3,646,924 A * 3/1972 Newkirk ............. F02M 21/042 123/576

(Continued)

FOREIGN PATENT DOCUMENTS

CN 106224130 12/2016
DE 19834852 A1 * 2/2000 ............... F02D 7/02

(Continued)

*Primary Examiner* — Logan M Kraft
*Assistant Examiner* — Joshua Campbell
(74) *Attorney, Agent, or Firm* — Harter Secrest & Emery LLP; Timothy W. Menasco, Esq.

(57) ABSTRACT

Presented is a method, system and apparatus for fuel flow control. An exemplary fuel flow control apparatus includes a fuel inlet operable to receive a flow, and a fuel shut-off valve fluidly connected to receive the flow from the fuel inlet, the fuel shut-off valve is operable to allow the flow in a first configuration and prevent the flow in a second configuration. The apparatus further includes a pressure regulator fluidly connected to receive the flow from the fuel shut-off valve, a flow control valve fluidly connected to receive the flow from the pressure regulator, the flow control valve comprising a position sensor operable to sense a position of the flow control valve, an injector fluidly connected in parallel to the flow control valve to receive the flow from the pressure regulator, and a fuel outlet.

16 Claims, 21 Drawing Sheets

(58) Field of Classification Search
USPC .......................................................... 123/527
See application file for complete search history.

(56) References Cited

U.S. PATENT DOCUMENTS

| | | | | | |
|---|---|---|---|---|---|
| 3,844,263 | A | * | 10/1974 | Endo | F02D 43/00 123/457 |
| 4,306,532 | A | * | 12/1981 | Camacho | F02D 19/0647 123/527 |
| 4,505,249 | A | * | 3/1985 | Young | F02D 19/0628 123/577 |
| 4,520,763 | A | * | 6/1985 | Lynch | F02D 19/023 123/527 |
| 4,541,397 | A | * | 9/1985 | Young | F02D 19/023 123/577 |
| 4,594,201 | A | * | 6/1986 | Phillips | F02M 13/06 123/511 |
| 6,401,446 | B1 | | 6/2002 | Gibbons | |
| 7,019,626 | B1 | * | 3/2006 | Funk | F02D 19/0623 60/740 |
| 2001/0032628 | A1 | | 10/2001 | Goto et al. | |
| 2013/0255638 | A1 | * | 10/2013 | Takagi | F02M 69/00 123/472 |
| 2013/0333671 | A1 | * | 12/2013 | Walser | F02M 21/0233 123/480 |
| 2018/0223774 | A1 | | 8/2018 | Walser et al. | |

FOREIGN PATENT DOCUMENTS

| | | | | | |
|---|---|---|---|---|---|
| EP | 2713035 | | | 4/2014 | |
| FR | 2704025 | A1 | * | 10/1994 | F01N 3/22 |
| JP | H09-96254 | | | 4/1997 | |
| JP | 2003027989 | A | * | 1/2003 | |
| JP | 2013-133794 | | | 7/2013 | |
| JP | 2013133794 | A | * | 7/2013 | |
| JP | 2015-525322 | | | 9/2015 | |
| KR | 1020130011603 | A | * | 1/2013 | |

* cited by examiner

FLOW CONTROL METHOD, SYSTEM AND APPARATUS

BACKGROUND OF THE INVENTION

Field of the Invention

The present disclosure relates generally to fluid pressure regulators, and more particularly to a multi-stage pressure regulating system for fuel.

Description of Related Art

Gaseous fuels such as propane and natural gas may be stored in pressurized vessels at high pressure. Conventional internal combustion engines do not operate with gaseous fuels stored at high pressure. Therefore, fuel systems may be utilized to reduce the pressure of the fuel entering the engine intake.

It is common practice with natural gas fuel systems to cut off fuel supply to the engine during motoring to help reduce emissions. Motoring occurs when there is no load applied to the engine. Conventional systems do this by closing a flow control valve, thereby sealing off fuel supply to the engine. However, the flow control valve typically allows some level of internal leakage that enables a small amount of fuel to escape to the engine intake.

BRIEF SUMMARY OF THE INVENTION

In view of the foregoing, it is an object of the present disclosure to provide a method, apparatus and system for controlling flow including fuel flow.

A first exemplary embodiment of the present disclosure provides a fuel flow control apparatus. The fuel flow control apparatus includes a fuel inlet, a pressure regulator in fluid communication with the fuel inlet, and a flow control valve in selective fluid communication with the pressure regulator. The fuel flow control apparatus further includes a fuel shut-off valve located fluidly between the pressure regulator and the flow control valve, wherein the fuel shut-off valve is operable to prevent fuel flow from the pressure regulator to the flow control valve, and a fuel outlet in fluid communication with an engine intake.

A second exemplary embodiment of the present disclosure provides a fuel flow control system. The fuel flow control system includes a manifold having a fuel inlet and a fuel outlet, and a solenoid operated proportional pressure regulator coupled with an exterior surface of the manifold, wherein the proportional pressure regulator is located upstream of, and in fluid communication with, the fuel inlet. The system further includes a solenoid proportional flow control valve at least partially housed within the manifold and in selective fluid communication with the pressure regulator, and a solenoid fuel ON/OFF shut-off valve located fluidly between the proportional pressure regulator and the proportional flow control valve, wherein the fuel ON/OFF shut-off valve is operable to prevent fuel flow from the proportional pressure regulator to the proportional flow control valve. The system still further includes a mixer located downstream of a fuel outlet of the manifold and the proportional flow control valve, wherein the proportional pressure regulator, the proportional flow control valve, and the fuel ON/OFF shut-off valve are electrically connected with an engine control module.

A third exemplary embodiment of the present disclosure provides a fuel flow control system. The system includes a manifold having a fuel inlet, and a solenoid operated proportional pressure regulator located at least partially within the manifold downstream of, and in fluid communication with, the fuel inlet. The system further includes an intermediate chamber at least partially defined by the manifold located downstream of, and in fluid communication with, the proportional pressure regulator, and a solenoid proportional flow control valve at least partially housed within the manifold and in selective fluid communication with the pressure regulator. The system still further includes a solenoid fuel ON/OFF shut-off valve located in a fluid flow path between the proportional pressure regulator and the proportional flow control valve, wherein the fuel ON/OFF shut-off valve is operable to prevent fuel flow from the proportional pressure regulator to the proportional flow control valve, wherein the fuel ON/OFF shut-off valve is in fluid communication with the intermediate chamber.

A fourth exemplary embodiment of the present disclosure provides a fuel flow control system. The system includes a manifold having a fuel inlet, and a solenoid operated proportional pressure regulator located at least partially within the manifold downstream of, and in fluid communication with, the fuel inlet. The system further includes an intermediate fluid flow path at least partially defined by the manifold located downstream of, and in fluid communication with, the proportional pressure regulator, and a plurality of ON/OFF flow control valves at least partially housed within the manifold and in selective fluid communication with the pressure regulator via the intermediate fluid flow path. The system still further includes a solenoid fuel ON/OFF shut-off valve located in a fluid flow path between the proportional pressure regulator and the plurality of ON/OFF flow control valves, wherein the fuel ON/OFF shut-off valve is operable to prevent fuel flow from the proportional pressure regulator to the plurality of ON/OFF flow control valves, wherein the fuel ON/OFF shut-off valve at least partially defines the intermediate fluid flow path.

A fifth exemplary embodiment of the present disclosure provides a method of providing a fuel flow control apparatus. The method includes providing a manifold having a fuel inlet and a fuel outlet, and providing a solenoid operated proportional pressure regulator coupled with an exterior surface of the manifold, wherein the proportional pressure regulator is located downstream of, and in fluid communication with, the fuel inlet. The method still further includes providing a solenoid proportional flow control valve at least partially housed within the manifold and in selective fluid communication with the pressure regulator, and providing a solenoid fuel ON/OFF shut-off valve located fluidly between the proportional pressure regulator and the proportional flow control valve, wherein the fuel ON/OFF shut-off valve is operable to prevent fuel flow from the proportional pressure regulator to the proportional flow control valve.

A sixth exemplary embodiment of the present disclosure provides a method of providing fuel flow control. The method includes providing a manifold having a fuel inlet and a fuel outlet, and providing a solenoid operated proportional pressure regulator located at least partially within the manifold downstream of, and in fluid communication with, the fuel inlet. The method still further includes providing a solenoid proportional flow control valve at least partially housed within the manifold and in selective fluid communication with the pressure regulator, wherein the proportional flow control valve is in fluid communication with an engine intake, providing a solenoid fuel ON/OFF shut-off valve located fluidly between the proportional pressure regulator and the proportional flow control valve, and operating the fuel ON/OFF shut-off valve an OFF state during engine motoring to prevent fuel flow from the proportional pressure regulator to the proportional flow control valve.

A seventh exemplary embodiment of the present disclosure provides a fuel flow control apparatus. The apparatus includes a manifold having a fuel inlet, and a plurality of digital pressure control valves located at least partially within the manifold in fluid communication with the fuel inlet. The apparatus still further includes an intermediate chamber at least partially defined by the manifold located downstream of, and in fluid communication with, the plurality of digital pressure control valves, and a plurality of digital flow control valves at least partially housed within the manifold and in selective fluid communication with plurality of digital pressure control valves via the intermediate chamber. The apparatus further includes a solenoid fuel ON/OFF shut-off valve located in a fluid flow path between the plurality of digital pressure control valves and the fuel inlet, wherein the fuel ON/OFF shut-off valve is operable to prevent fuel flow plurality of digital pressure control valves.

An eighth exemplary embodiment of the present disclosure provides an apparatus for controlling flow. The apparatus includes a fuel inlet operable to receive a flow, and a fuel shut-off valve fluidly connected to receive the flow from the fuel inlet, the fuel shut-off valve is operable to allow the flow in a first configuration and prevent the flow in a second configuration. The apparatus further comprising a pressure regulator fluidly connected to receive the flow from the fuel shut-off valve, and a flow control valve fluidly connected to receive the flow from the pressure regulator, the flow control valve comprising a position sensor operable to sense a position of the flow control valve. The apparatus still further comprising an injector fluidly connected in parallel to the flow control valve to receive the flow from the pressure regulator, and a fuel outlet fluidly connected to receive the flow from the flow control valve and the injector, wherein the pressure regulator is operable to maintain a pressure of the flow to the flow control valve and the injector at a predetermined pressure, and wherein at least one of the flow control valve and the injector are operable to incrementally allow the flow to pass to the fuel outlet.

A ninth exemplary embodiment of the present disclosure provides an apparatus for controlling flow. The apparatus includes an electrically operated pressure regulator operable to receive a flow from a fuel inlet, and a fuel shut-off valve fluidly connected downstream from the electrically operated pressure regulator, the fuel shut-off valve operable to receive the flow from the pressure regulator, the fuel shut-off valve operable to allow the flow to pass in a first configuration and to prevent the flow from passing in a second configuration. The apparatus further includes a proportional flow control valve fluidly connected downstream from the fuel shut-off valve, the proportional flow control valve operable to receive the flow from the fuel shut-off valve, the proportional flow control valve fluidly connected upstream from a fuel outlet, the proportional flow control valve comprising a position sensor operable to sense a position of the flow control valve, and an injector fluidly connected in parallel to the proportional flow control valve downstream from the fuel shut-off valve, the injector operable to receive the flow from the fuel shut-off valve, the injector fluidly connected upstream from the fuel outlet.

A tenth exemplary embodiment of the present disclosure provides a fuel flow control system. The system includes an electrically operated pressure regulator fluidly connected downstream from a fuel inlet, and a fuel shut-off valve fluidly connected downstream from the electrically operated pressure regulator, the fuel shut-off valve operable to allow a flow to pass in a first configuration and to prevent the flow from passing in a second configuration. The system further includes a proportional flow control valve fluidly connected downstream from the fuel shut-off valve, the proportional flow control valve fluidly connected upstream from a fuel outlet, the proportional flow control valve comprising a position sensor operable to sense a position of the flow control valve, and a pressure regulator fluidly connected in parallel to the electrically operated pressure regulator downstream from the fuel inlet. The system still further includes a second fuel shut-off valve fluidly connected downstream from the fuel inlet, the second fuel shut-off valve operable to allow a flow to pass in a first arrangement and to prevent the flow from passing in a second arrangement, and an injector fluidly connected downstream from the second fuel shut-off valve, the injector fluidly connected upstream from the fuel outlet.

An eleventh exemplary embodiment of the present disclosure provides a method of providing. The method includes providing a fuel inlet operable to receive a flow, and providing a fuel shut-off valve fluidly connected to receive the flow from the fuel inlet, the fuel shut-off valve is operable to allow the flow in a first configuration and prevent the flow in a second configuration. The method further includes providing a pressure regulator fluidly connected to receive the flow from the fuel shut-off valve. The method still further includes providing a flow control valve fluidly connected to receive the flow from the pressure regulator, the flow control valve comprising a position sensor operable to sense a position of the flow control valve, and providing an injector fluidly connected in parallel to the flow control valve to receive the flow from the pressure regulator. The method further includes providing a fuel outlet fluidly connected to receive the flow from the flow control valve and the injector, wherein the pressure regulator is operable to maintain a pressure of the flow to the flow control valve and the injector at a predetermined pressure, and wherein at least one of the flow control valve and the injector are operable to incrementally allow the flow to pass to the fuel outlet.

The following will describe embodiments of the present disclosure, but it should be appreciated that the present disclosure is not limited to the described embodiments and various modifications of the invention are possible without departing from the basic principles. The scope of the present disclosure is therefore to be determined solely by the appended claims.

BRIEF DESCRIPTION OF THE SEVERAL VIEWS OF THE DRAWINGS

The accompanying drawings are incorporated herein as part of the specification. The drawings described herein illustrate embodiments of the presently disclosed subject matter and are illustrative of selected principles and teachings of the present disclosure. However, the drawings do not illustrate all possible implementations of the presently disclosed subject matter and are not intended to limit the scope of the present disclosure in any way.

DETAILED DESCRIPTION OF THE INVENTION

Figure 1:
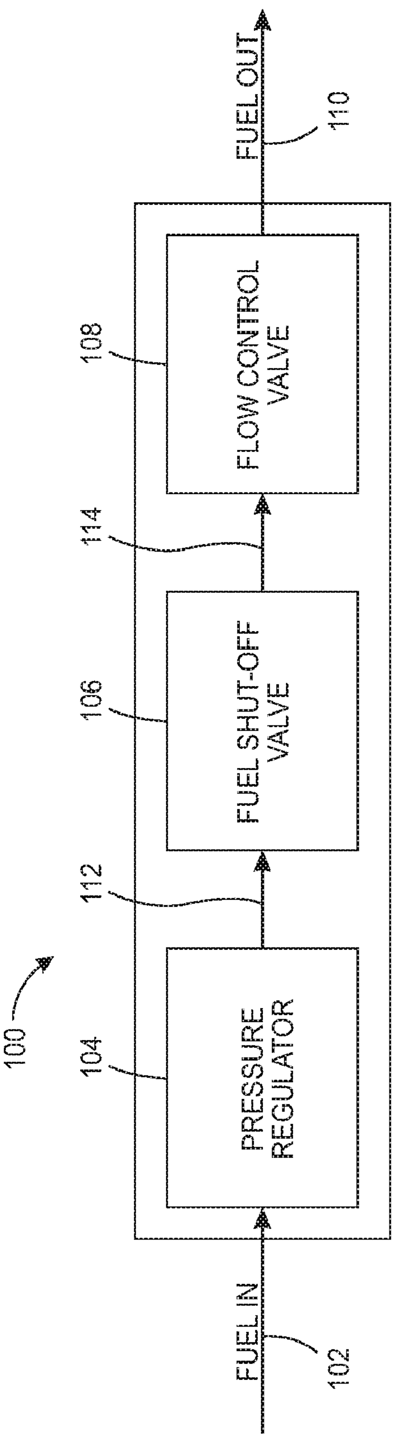
FIG. 1 illustrates a schematic of an exemplary fuel flow control system according to an embodiment of the present disclosure.

It is to be understood that the invention may assume various alternative orientations and step sequences, except where expressly specified to the contrary. It is also to be understood that the specific assemblies and systems illustrated in the attached drawings and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

There remains a need for a fuel flow control system capable of improved performance and reliability. The fuel flow control system of the present disclosure provides several performance and reliability advantages over existing conventional valve systems, fuel flow systems, and natural gas fuel systems. Embodiments of the present disclosure provide a fuel shut-off valve between a low pressure regulating valve and a flow control valve operable to seal off the supply of fuel at the shut-off valve during motoring when no load is applied to the engine. The fuel flow control system of the present disclosure thereby reduces the volume of fuel that can pass by the flow control valve to the engine intake during motoring.

Figure 2:
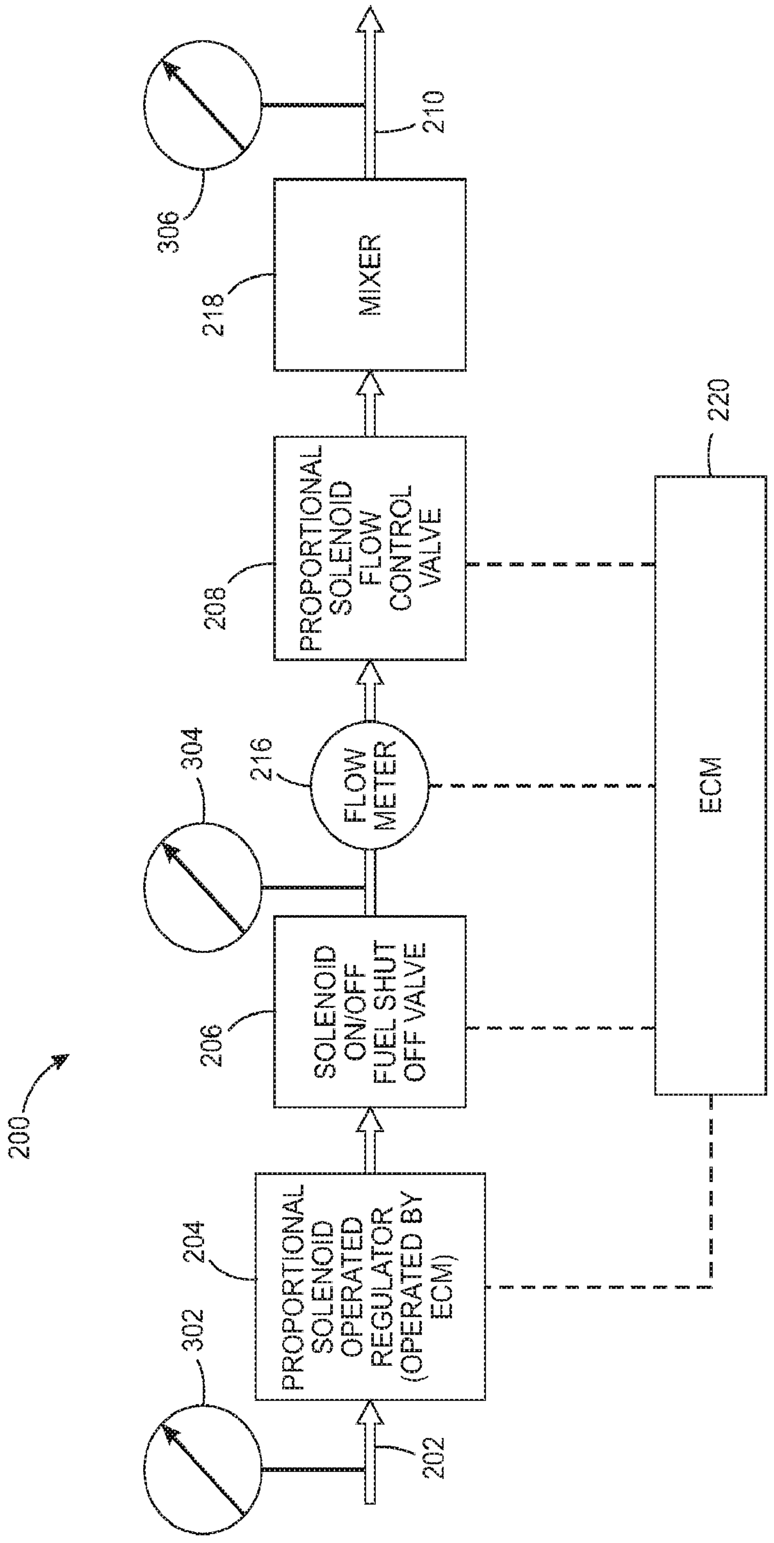
FIG. 2 illustrates a schematic of another exemplary fuel flow control system according to an embodiment of the present disclosure.
Figure 3:
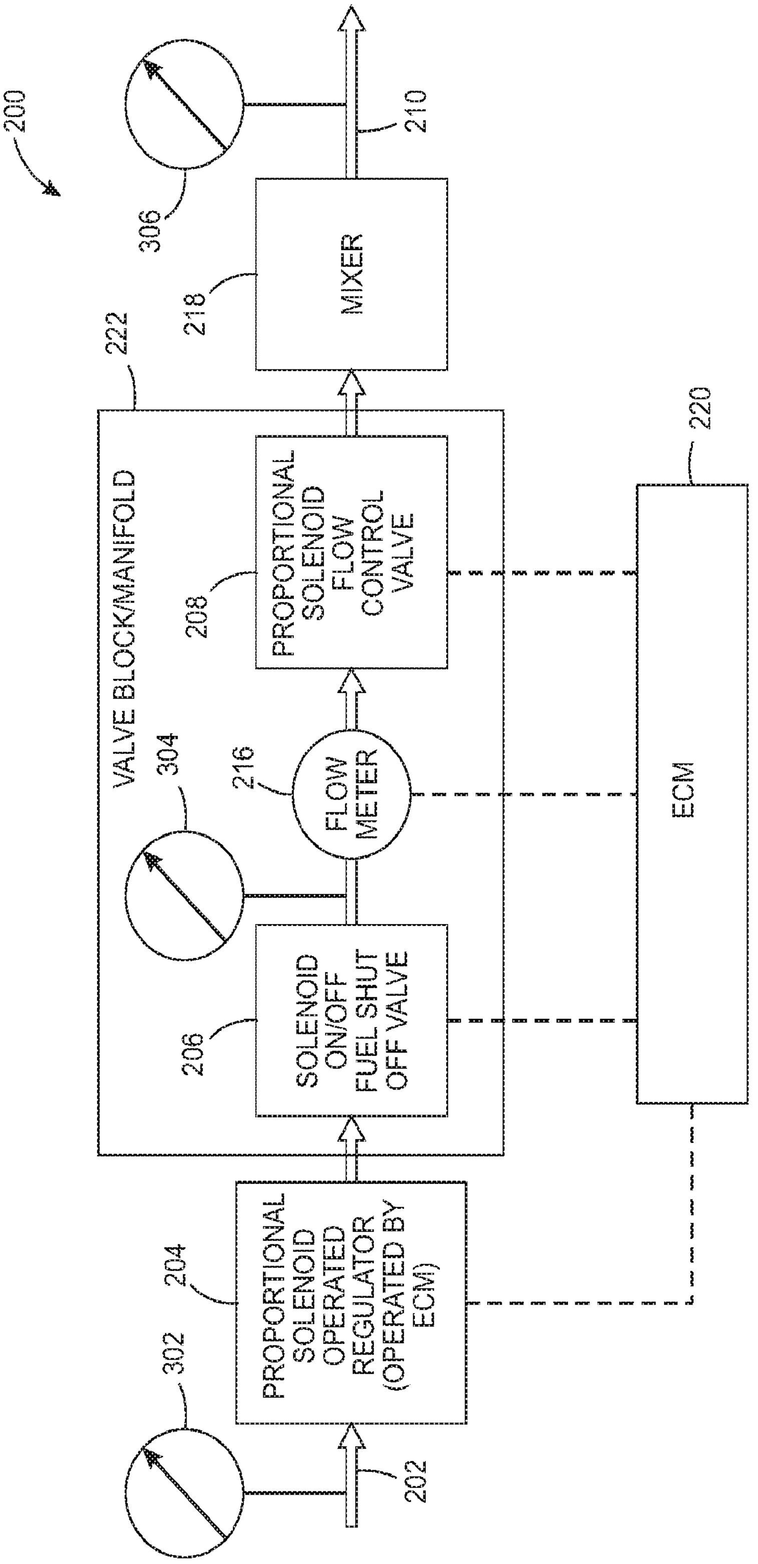
FIG. 3 illustrates a schematic of the fuel flow control system wherein the fuel shut-off valve and the flow control valve are located within a valve block assembly according to an embodiment of the present disclosure.

Referring to FIGS. 1-3, shown are block diagrams of exemplary embodiments of the present disclosure. Shown in FIG. 1 is a simplified block diagram of an exemplary fuel flow control apparatus 100. The fuel flow control apparatus includes a fuel inlet 102 in fluid communication with a fluidly connected pressure regulator valve 104, followed by a fluidly connected fuel shut-off valve 106, followed by a fluidly connected flow control valve 108 that allows a flow through a fuel outlet 110. Pressure regulator 104 and fuel shut-off valve 106 are fluidly connected by line 112. Fuel shut-off valve 106 and flow control valve 108 are fluidly connected by line 114.

Referring to FIG. 2, in this embodiment, the aspects similar to that shown in FIG. 1 are depicted with the addition of a flow meter 216 fluidly disposed between the fuel shut off valve 206 and the flow control valve 208. Shown in FIG. 2 is fuel inlet 202, proportional solenoid operated pressure regulator 204, solenoid on/off fuel shut off valve 206, flow meter 216, proportional solenoid flow control valve 208, and fuel outlet 210. Embodiments of proportional solenoid operated pressure regulator 204 are operable to reduce, increase or maintain the input pressure of a flow of fuel that it receives such that the flow of fuel output by the proportional solenoid operated regulator 204 is at a set or predetermined pressure. The embodiment depicted in FIG. 2 also includes a mixer 218, pressure sensors 302, 304, 306 and an engine control module ("ECM") 220 electrically connected to the proportional solenoid operated regulator 204, the fuel shut-off valve 206, the flow meter 216, and the flow control valve 208. Embodiments of mixer 218 are operable to mix the received flow of fuel with air to produce a combustible fuel-air mix. Embodiments of fuel shut-off valve 106, 206 include actuated valves that are operable to either (i) allow a flow of fuel to pass from its inlet to its outlet such that the inlet pressure it receives is the same or approximately the same as its outlet pressure, or (ii) completely stop the flow of fuel that it receives at its input such that no flow of fuel leaves its outlet. Embodiments of flow meter 216 is any device that is operable to measure the flow rate of fuel that travels or passes through flow meter 216 or between fuel shut-off valve 206 and proportional solenoid flow control valve 208. Embodiments of proportional solenoid flow control valve 208 are operable to regulate the flow or pressure of the fuel that it receives such that the flow rate or pressure of fuel that it expels to the mixer 218 is at a desired rate or level. Embodiments pressure sensors 302, 304, 306 are operable to measure the pressure of the flow of fuel that it receives. Pressure sensor 302 is operable to measure the pressure of the flow of fuel it receives from inlet 202. Pressure sensor 304 is operable to measure the pressure of the flow of fuel it receives from the solenoid on/off fuel shut off valve. Pressure sensor 306 is operable to measure the pressure of the flow of fuel it receives from the mixer 218.

Referring to FIG. 3, shown is the embodiment depicted in FIG. 2 with the addition of a valve block/manifold 222. In this embodiment, the fuel shut-off valve 206, the flow meter 216 and the flow control valve 208 are located within the manifold 222. Embodiments include the proportional solenoid operated regulator 204 being located outside the manifold 222, partially within the manifold 222 and completely within the manifold 222.

As illustrated in FIGS. 4-7, in an embodiment, a multi-stage fuel flow control apparatus 200 includes a manifold 222 that at least partially defines an intermediate chamber 224. The manifold 222 may at least partially house a solenoid operated proportional regulator 204 upstream of the intermediate chamber 224. The intermediate chamber 224 is divided by a solenoid ON/OFF fuel shut-off valve 206. Downstream of the fuel shut-off valve 206, the manifold 222 at least partially houses a solenoid operated proportional flow control valve 208. The proportional regulator 204, the fuel shut-off valve 206, and the proportional flow control valve 208 are all connected in series.

The fuel pressure and temperature are measured/monitored after the fuel shut-off valve 206, but prior to the proportional flow control valve 208. In one embodiment, the proportional regulator 204 is controlled by and electrically connected to a first controller 226, and the fuel flow control valve 208 is controlled by and electrically connected to a second controller 228. In an embodiment, the first controller 226 is located on a first printed circuit board (PCB), and the second controller 228 is located on a second PCB. In this embodiment, the first and second PCBs are separate and distinct from one another such that they are not coupled to one another. In another embodiment, the first and second controllers 226, 228 are located on the same PCB. In other words, embodiments include both the proportional regulator 204 and the fuel flow control valve 208 being electrically connected to the integrated PCB housed within the manifold 222. Embodiments include the ON/OFF fuel shut-off valve 206 not being connected to the PCB.

In another embodiment, the proportional regulator 204 may be electrically connected to and controlled by an engine control module ("ECM") 220. Embodiments of the electrical connection between the ECM 220 and the proportional regulator 204 include using the integrated PCB as a pass through to the ECM 220. In this embodiment, the fuel flow control valve 208 is electrically connected to and controlled by a controller 226 that is separate and distinct from the ECM 220. In yet another embodiment, the fuel flow control valve 208 is electrically connected to and controlled by the ECM 220 while the proportional regulator 204 is electrically connected to and controlled by a controller 226 that is separate and distinct from the ECM 220. In yet a further embodiment, both the fuel flow control valve 208 and the proportional regulator 204 are electrically connected to and controlled by the ECM 220. It should be appreciated that embodiments include one or both controllers 226, 228 being located within the manifold 222 and outside the manifold 222.

Figure 8:
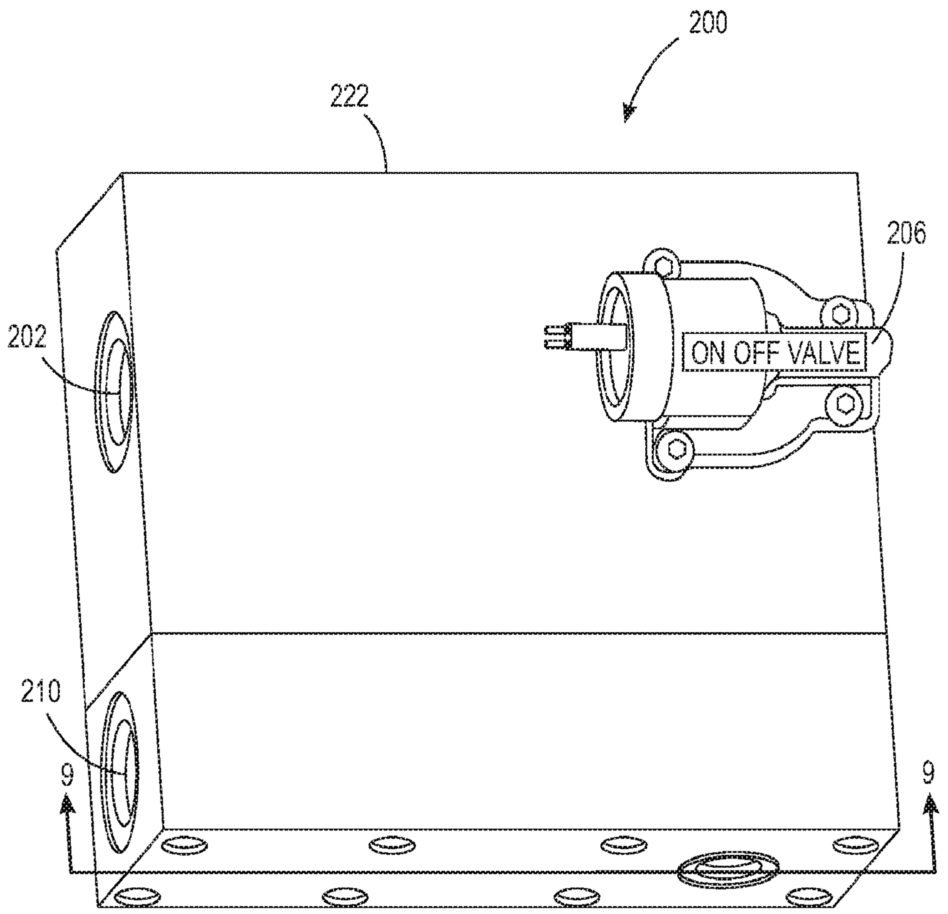
FIG. 8 illustrates a perspective view of an exemplary fuel flow control system having four ON/OFF valves according to an embodiment of the present disclosure.
Figure 9:
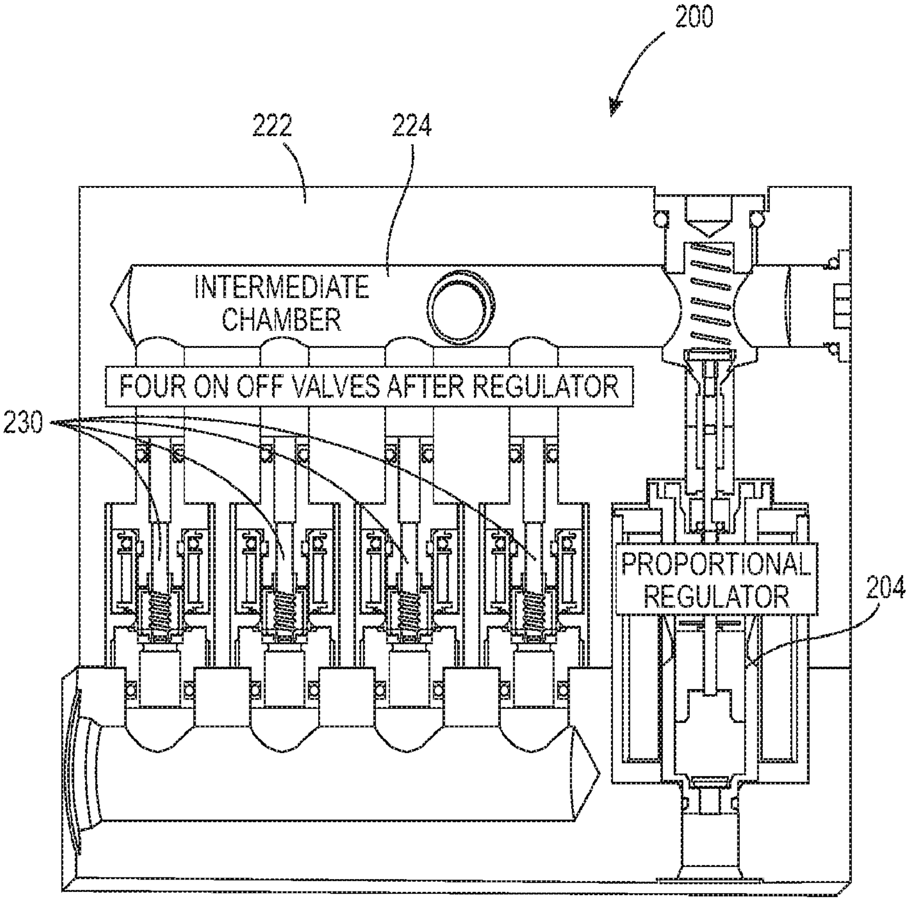
FIG. 9 illustrates a cross sectional view of a portion of an exemplary fuel flow control system having four ON/OFF valves located between a proportional pressure regulator and an engine intake according to an embodiment of the present disclosure.

As illustrated in FIGS. 8 & 9, in an embodiment, a multi-stage fuel flow control system includes a manifold 222 that at least partially defines a fluid inlet 202, an intermediate chamber 224, and a fluid outlet 210. The manifold 222 at least partially houses a solenoid ON/OFF fuel shut-off valve 206 fluidly between the fuel inlet 202 and the intermediate chamber 224. The manifold 222 may also at least partially house a solenoid operated proportional regulator 204 located downstream of the solenoid ON/OFF fuel shut-off valve 206 and upstream of the intermediate chamber 224. Downstream of the solenoid operated proportional regulator 204 and the intermediate chamber 224, the manifold 222 at least partially houses a plurality of ON/OFF flow control valves 230 to control the fuel flow to the engine intake. In an embodiment, as illustrated in FIG. 9, the manifold 222 may house four ON/OFF flow control valves 230. In an embodiment, the plurality of ON/OFF flow control valves 230 may comprise a plurality of digital ON/OFF injectors. In this regard, embodiments include the manifold 222 housing less than four, and more than four, ON/OFF flow control valves 230. Embodiments of ON/OFF flow control valves 230 are operable to moving to and from an opened position allowing a flow of fuel and closed position obstructing a flow of fuel many times per second.

Figure 4:
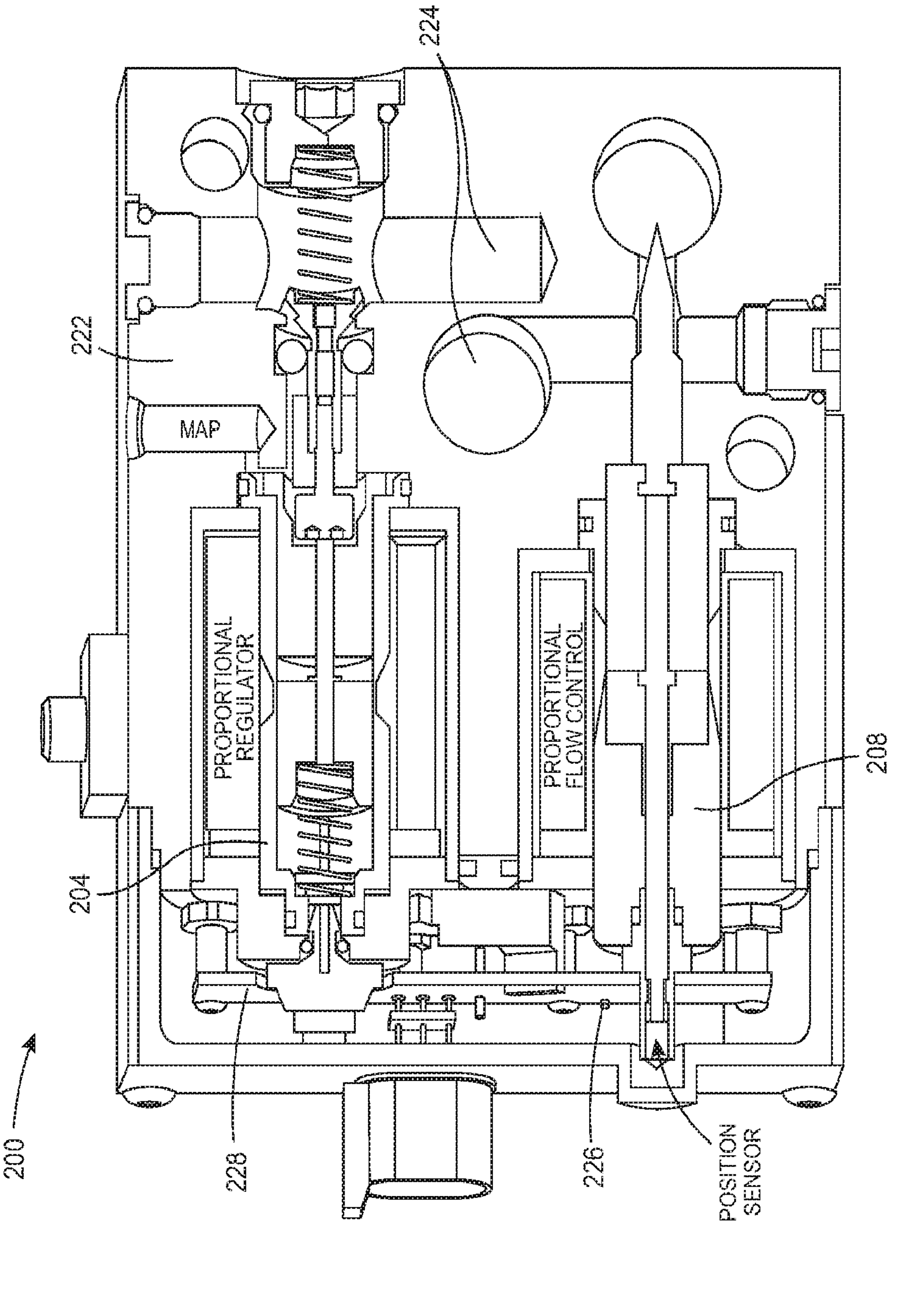
FIG. 4 illustrates a cross sectional view of a portion of an exemplary fuel flow control system according to an embodiment of the present disclosure.
Figure 5:
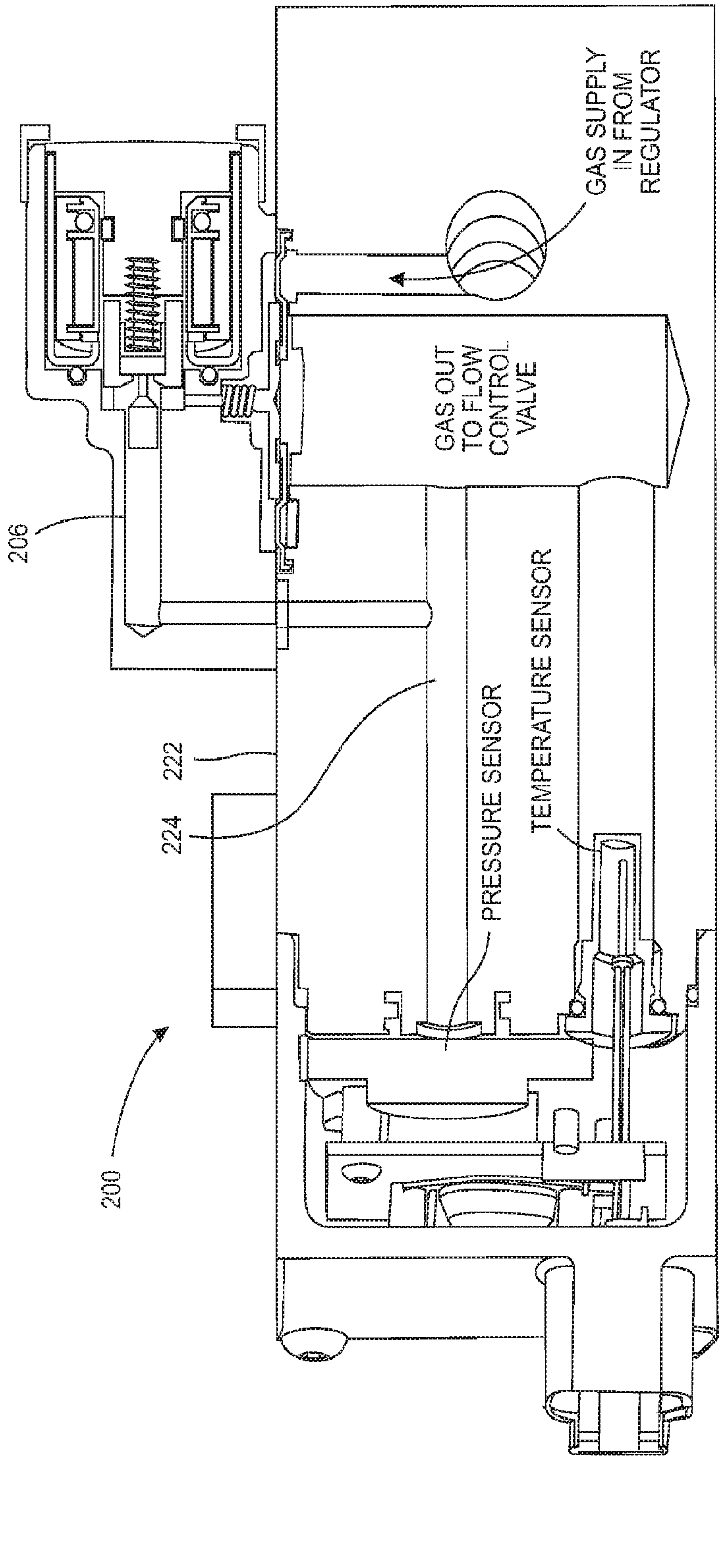
FIG. 5 illustrates another cross sectional view of a portion of an exemplary fuel flow control system according to an embodiment of the present disclosure.
Figure 6:
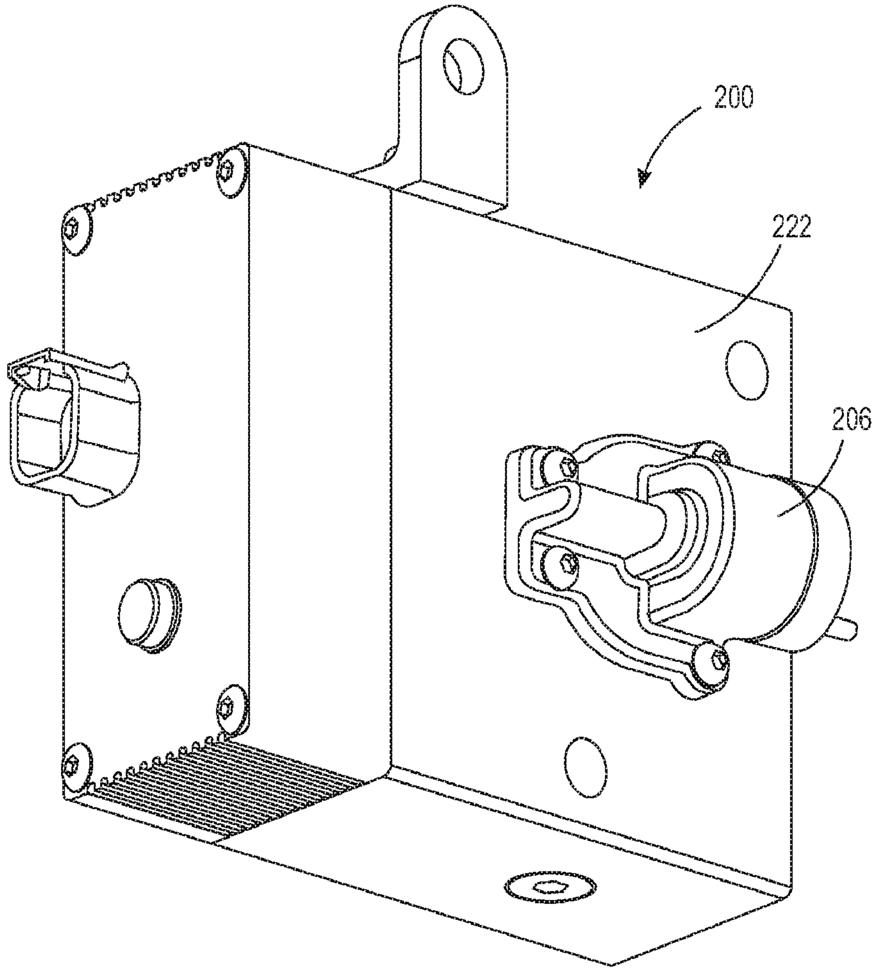
FIG. 6 illustrates a perspective view of a portion of an exemplary fuel flow control system according to an embodiment of the present disclosure.
Figure 7:
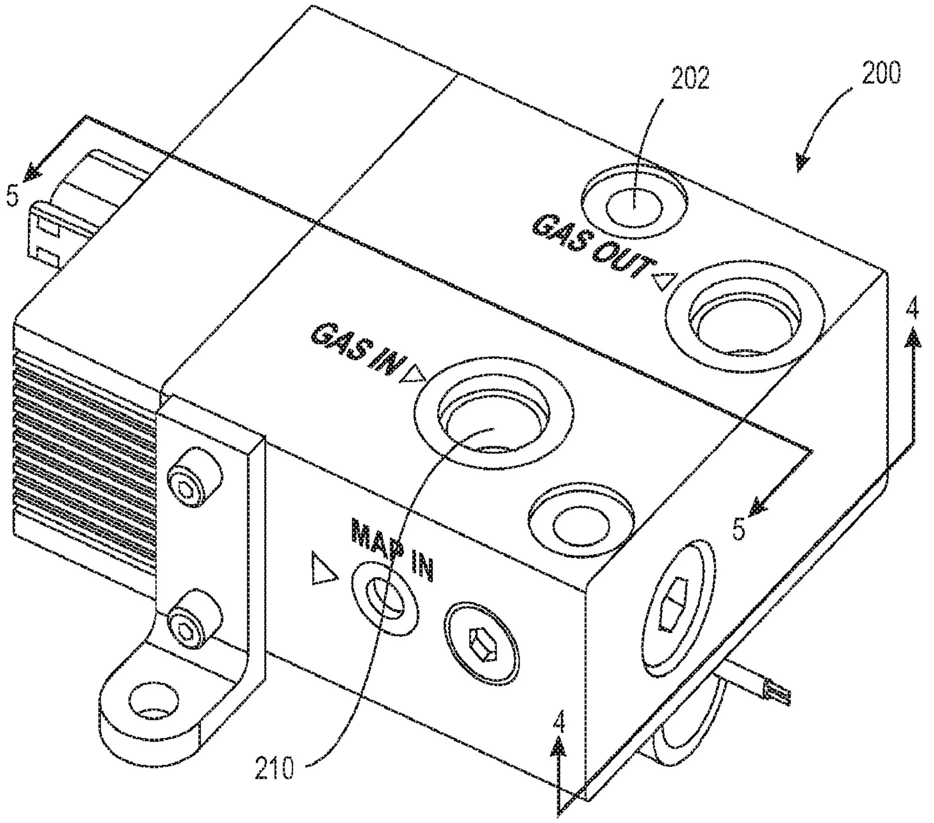
FIG. 7 illustrates another perspective view of a portion of an exemplary fuel flow control system according to an embodiment of the present disclosure.

Embodiments further include the solenoid operated proportional regulator 204 depicted in FIG. 9 being replaced with a plurality of ON/OFF flow control valves (e.g., 230). In this embodiment, the four ON/OFF flow control valves 230 are replaced by a proportional fuel flow control valve 208 as depicted in FIG. 4. It should be appreciated that embodiments of ON/OFF flow control valves 230 and the fuel shut-off valve 206 are operable to allow a flow of fluid (e.g., fuel) and are also operable to completely stop a flow of fluid such that there is no fluid flow through ON/OFF flow control valves 230 and/or fuel shut-off valve 206.

Figure 10:
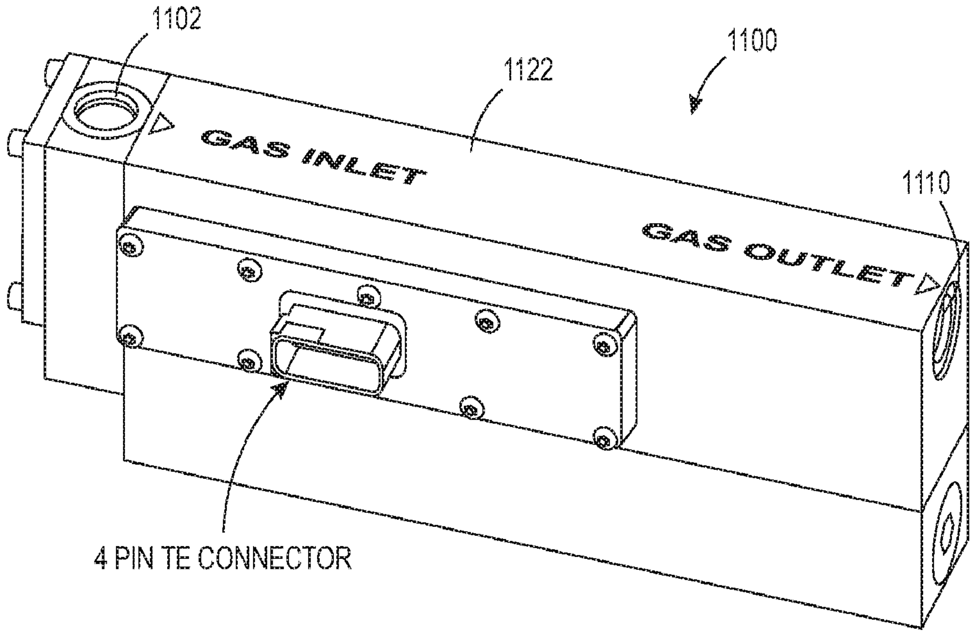
FIG. 10 illustrates a perspective view of a portion of an exemplary fuel flow control system according to an embodiment of the present disclosure.
Figure 11:
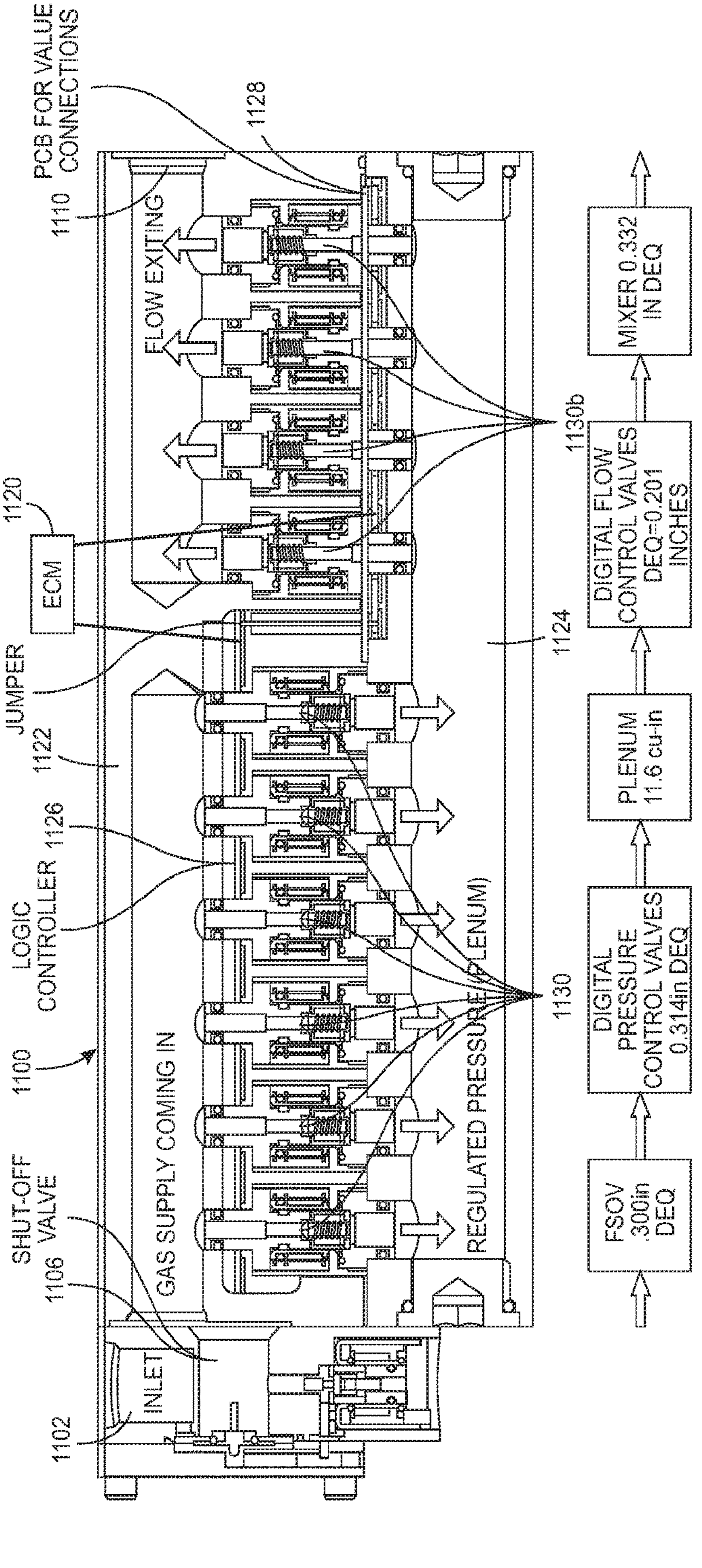
FIG. 11 illustrates a cross sectional view of a portion of an exemplary fuel flow control system according to an embodiment of the present disclosure.

As illustrated in FIGS. 10 and 11, in an embodiment, a multi-stage fuel flow control system 1100 includes a manifold 1122 that at least partially defines a plenum or intermediate chamber 1124. The manifold 1122 may at least partially house a first plurality of ON/OFF valves 1130 upstream of the intermediate chamber 1124 for regulating the pressure of the fluid entering the manifold 1222 via the fuel inlet 1102. Downstream of the intermediate chamber 1124, the manifold 1122 at least partially houses a second plurality of ON/OFF valves **1130*b* for controlling the flow of fluid to the fuel outlet 1110 of the manifold 1122. A fuel shut-off valve 1104 may be located at least partially within the manifold 1122 fluidly between the manifold fuel inlet 1102 and the first plurality of ON/OFF valves 1130. In an embodiment, the first plurality of ON/OFF valves 1130 may comprise five digital pressure control solenoid valves and the second plurality of ON/OFF valves 1130*b*** may comprise four digital flow control solenoid valves.

With continued reference to FIGS. 10 and 11, in an embodiment, the first plurality of ON/OFF valves 1130 may be electrically connected to a first logic controller 1126 and the second plurality of ON/OFF valves **1130*b* may be electrically connected to a printed circuit board 1128. The first logic controller 1126 may control operation of both the first and second pluralities of ON/OFF valves 1130, 1130*b*. In another embodiment, the fuel shut-off valve 1104 and the first plurality of ON/OFF valves 1130 may be electrically connected to an ECM 1120, while the second plurality of ON/OFF valves 1130*b* are electrically connected to a logic controller 1128 integrated with the manifold 1122. In another embodiment, the fuel shut-off valve 1104 and the first and second pluralities of ON/OFF valves 1130, 1130*b*** may each be electrically connected to and controlled via the ECM 1120 (which is optionally depicted in FIG. 11). In yet another embodiment, the fuel shut-off valve 1106 and the first and second pluralities of ON/OFF valves 1130, 1130*b* may each be electrically connected to and controlled via a logic controller 1126, 1128 integrated within the manifold 1122.

Figure 12:
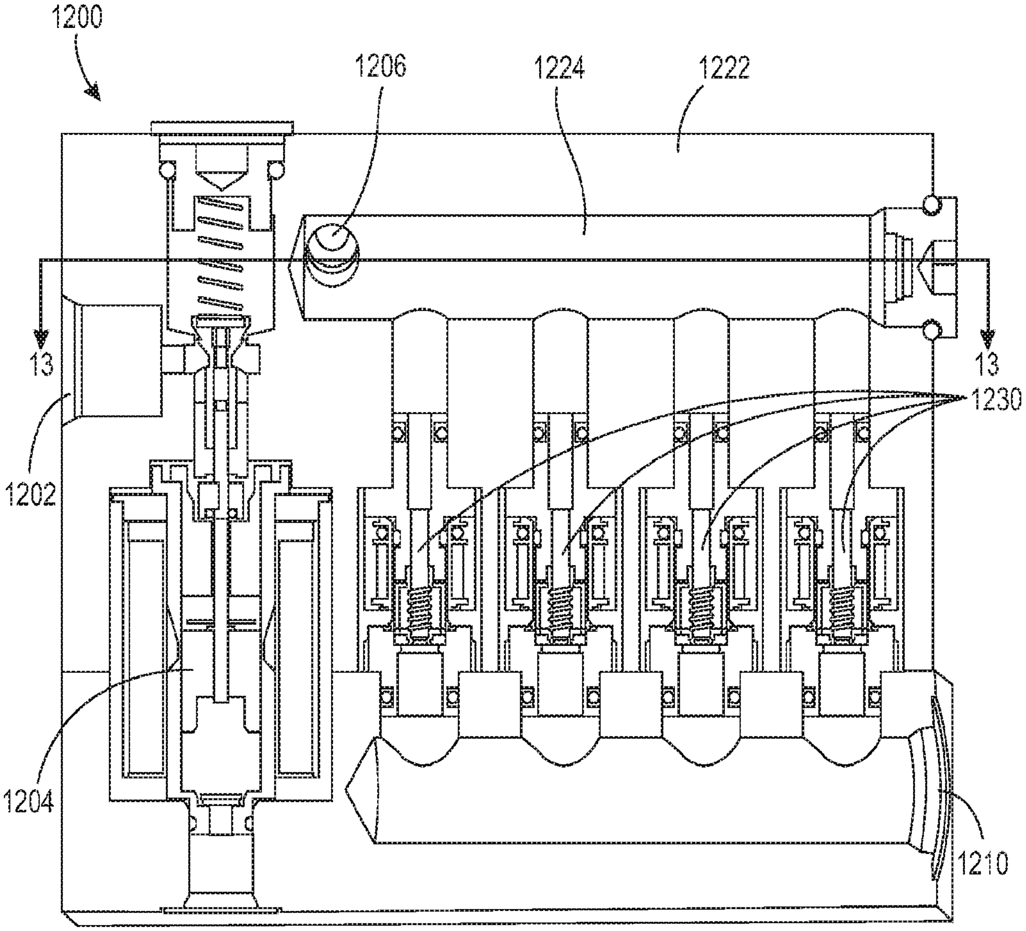
FIG. 12 illustrates a cross sectional view of a portion of an exemplary fuel flow control system having ON/OFF valves located between a fuel shut-off valve and an engine intake according to an embodiment of the present disclosure.
Figure 13:
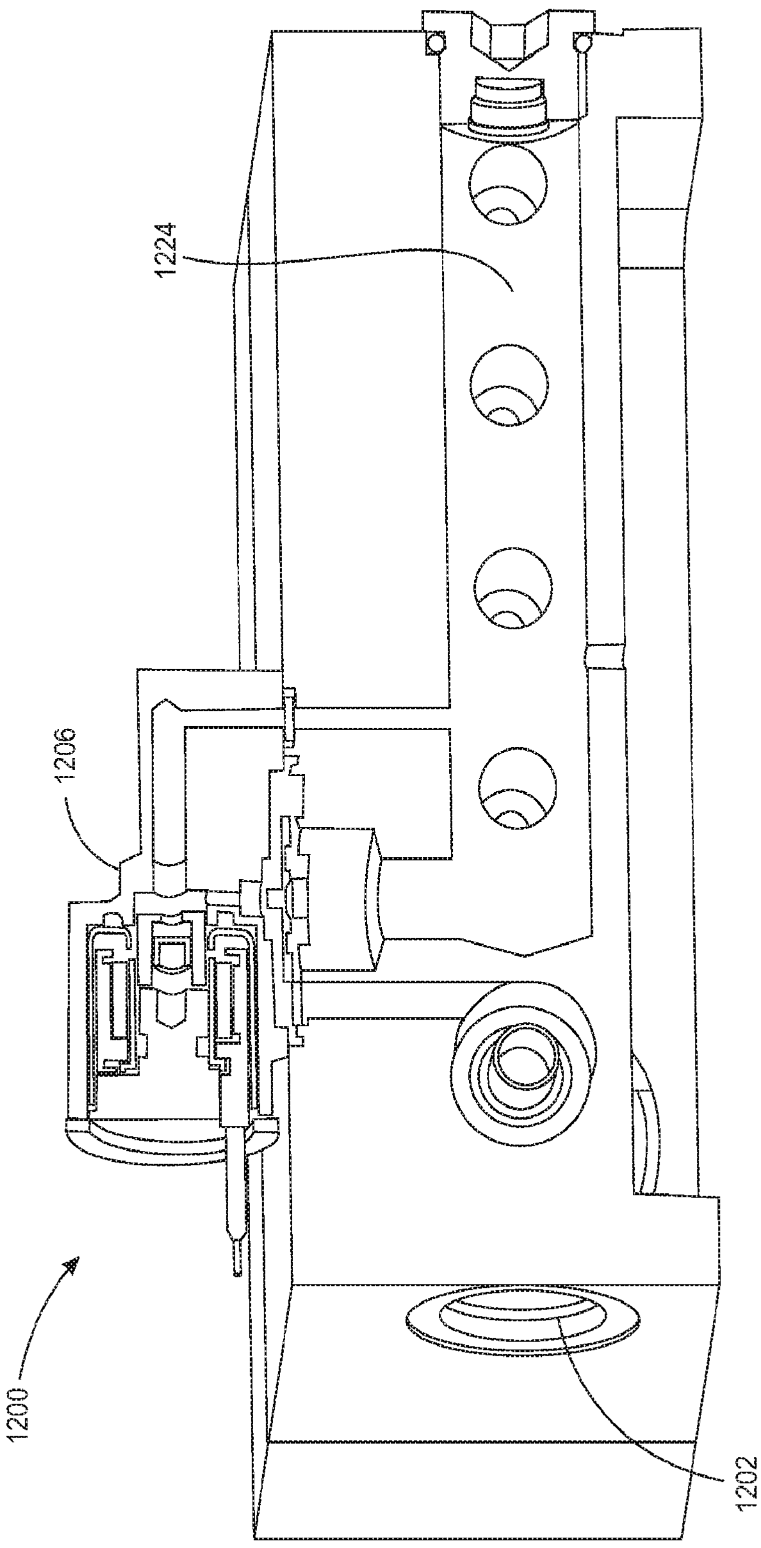
FIG. 13 illustrates a cross sectional view of a portion of an exemplary fuel flow control system having a fuel shut-off valve located between a plurality of ON/OFF valves and a pressure regulating valve according to an embodiment of the present disclosure.

As illustrated in FIGS. 12 & 13, in an embodiment, a multi-stage fuel flow control system 1200 includes a manifold 1222 that at least partially defines a fluid inlet 1202, an intermediate chamber 1224, and a fluid outlet 1210. The manifold 1222 may at least partially house a solenoid operated proportional regulating valve 1204 located downstream of the fluid inlet 1202. The manifold 1222 at least partially houses a solenoid ON/OFF fuel shut-off valve 1206 located fluidly between the solenoid operated proportional regulating valve 1204 and the intermediate chamber 1224. The solenoid operated proportional regulating valve 1204 controls the pressure of the fluid communicated from the fluid inlet 1202 to the intermediate chamber 1224 via the fuel shut-off valve 1206. Downstream of the fuel shut-off valve 1206 and the intermediate chamber 1224, the manifold 1222 at least partially houses a plurality of ON/OFF flow control valves 1230 to control the fuel flow to the engine intake. In an embodiment, as illustrated in FIG. 11, the manifold 1122 may house four ON/OFF flow control valves 1130. In an embodiment, the plurality of ON/OFF flow control valves 1230 may comprise a plurality of digital ON/OFF injectors. In this regard, embodiments include the manifold 1222 housing less than four, and more than four, ON/OFF flow control valves 1230.

Figure 14:
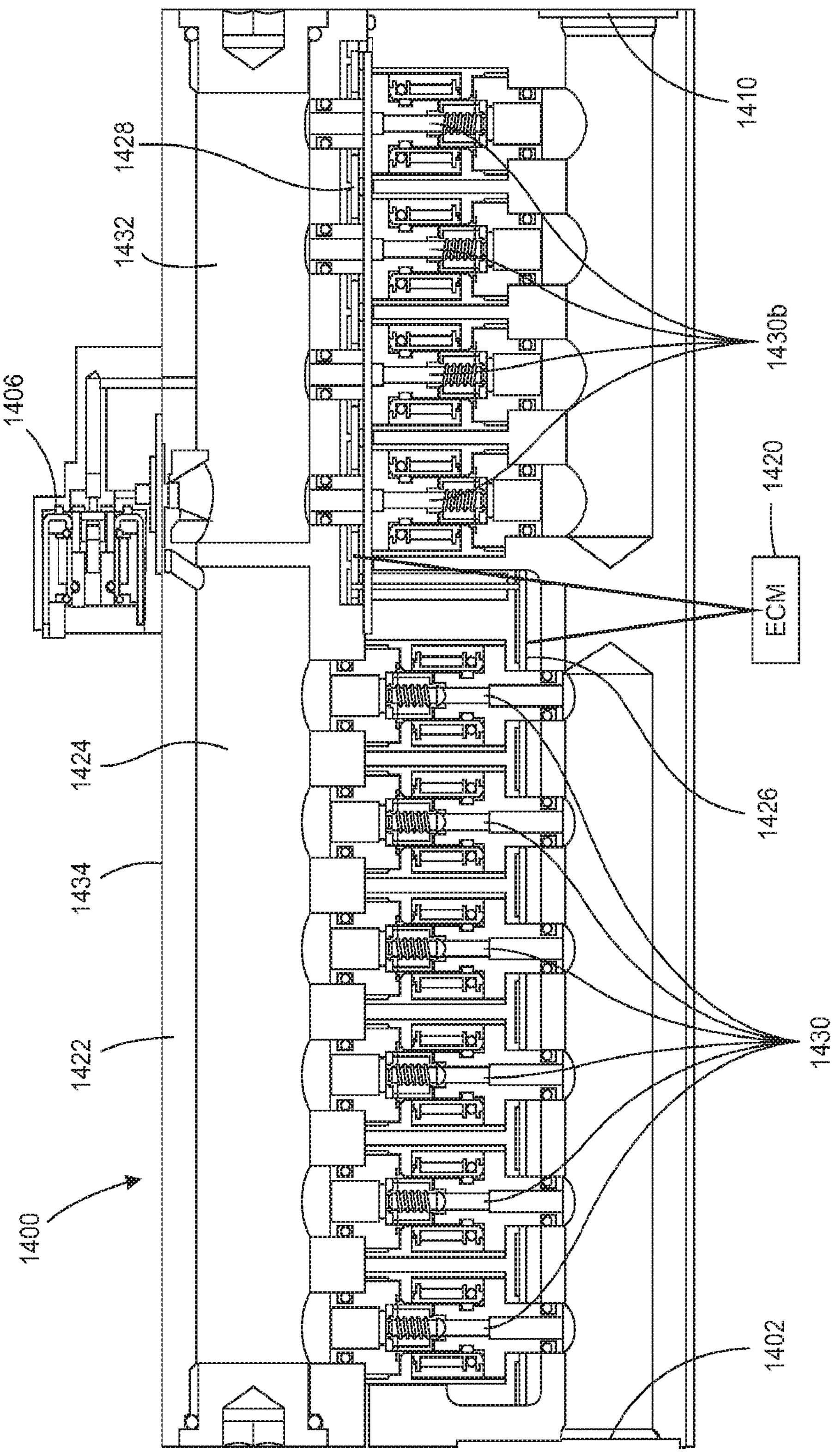
FIG. 14 illustrates a cross sectional view of a portion of an exemplary fuel flow control system according to an embodiment of the present disclosure.

As illustrated in FIG. 14, in an embodiment, a multi-stage fuel flow control system 1400 includes a manifold 1422 that at least partially defines a fluid inlet 1402, a first plenum or intermediate chamber 1424, a second plenum or intermediate chamber 1432, and a fluid outlet 1410. The manifold 1422 may at least partially house a first plurality of ON/OFF valves 1430 for regulating the pressure of the fluid entering the manifold 1422 via the fuel inlet 1402. The first plurality of ON/OFF valves 1430 are located downstream of the fluid inlet 1402 and upstream of the first intermediate chamber 1424, facilitating fluid communication therebetween. A fuel shut-off valve 1406 may be located fluidly between the manifold 1422 the first intermediate chamber 1424 and the second intermediate chamber 1432 for facilitating selective fluid communication therebetween. In an embodiment, the fuel shut-off valve 1406 may be coupled with an exterior surface 1434 of the manifold 1422. Downstream of the second intermediate chamber 1432, the manifold 1422 at least partially houses a second plurality of ON/OFF valves 1430*b* for controlling the flow of fluid to the fuel outlet 1410 of the manifold 1422. In an embodiment, the first plurality of ON/OFF valves 1430 may comprise six digital pressure control solenoid valves and the second plurality of ON/OFF valves 1430*b* may comprise four digital flow control solenoid valves.

In an embodiment, the fuel shut-off valve 1406 and the first and second pluralities of ON/OFF valves 1430, 1430*b* may each be electrically connected to and controlled via the ECM 1420 (which is optionally illustrated in FIG. 14). In another embodiment, the fuel shut-off valve 1406 and the first and second pluralities of ON/OFF valves 1430, 1430*b* may each be electrically connected to and controlled via a logic controller 1426 integrated with the manifold 1422. In yet another embodiment, the fuel shut-off valve 1406 and the first plurality of ON/OFF valves 1430 may be electrically connected to and controlled via a first logic controller 1426 integrated with the manifold 1422, and the second plurality of ON/OFF valves 1430*b* may be electrically connected to and controlled via a second logic controller 1428. It should be appreciated that embodiments include there being more or less ON/OFF valves 1430, 1430*b* than the quantity depicted in FIG. 14.

Figure 15:
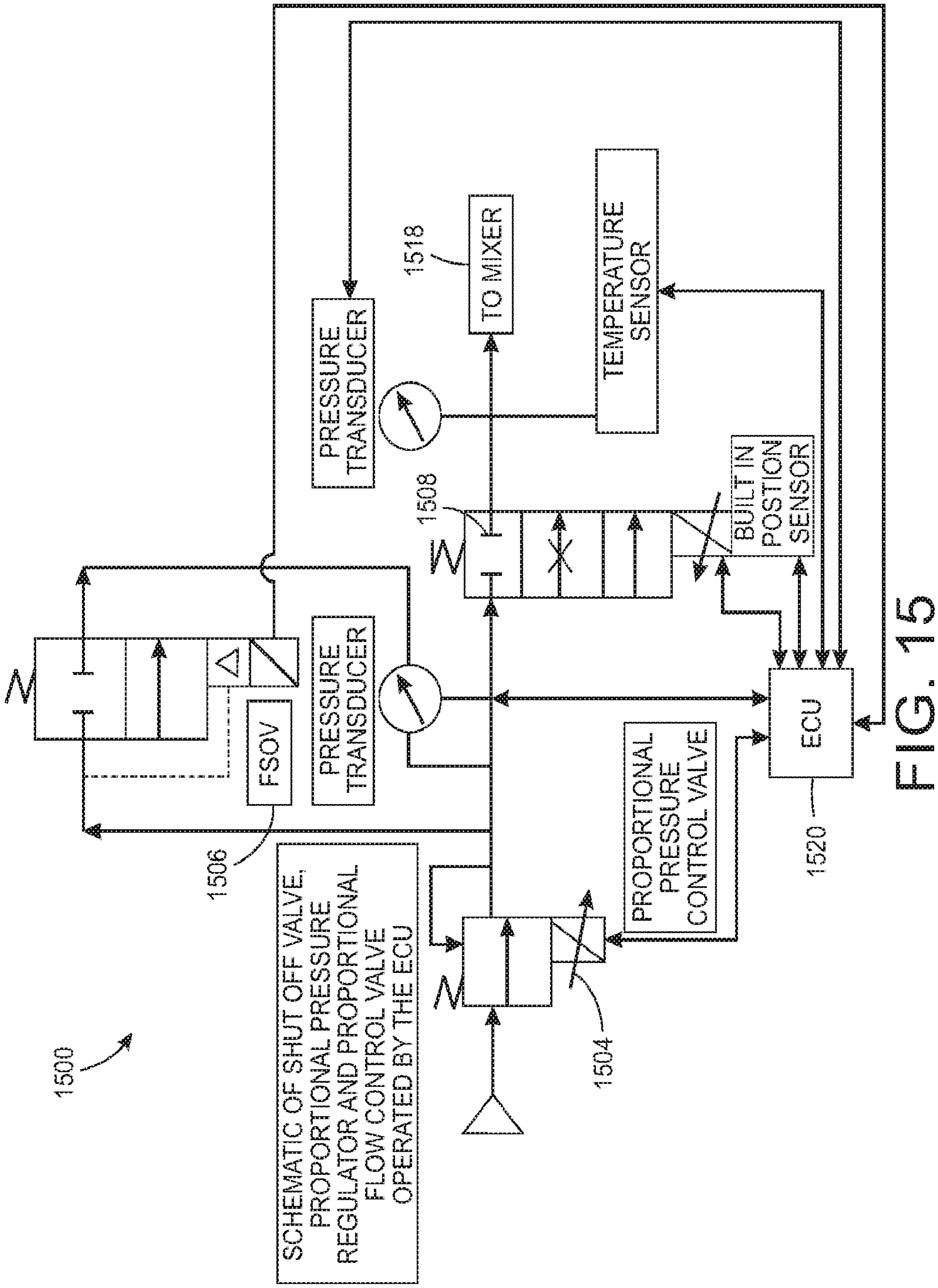
FIG. 15 illustrates a schematic of another exemplary fuel flow control system according to an embodiment of the present disclosure.

As illustrated in FIG. 15, in an embodiment, a multi-stage fuel flow control system 1500 includes a proportional pressure control valve 1504 in fluid communication with a fuel shut-off valve 1506. The fuel shut-off valve 1506 is also in fluid communication with a proportional flow control valve 1508 and facilitates selective fluid communication between the proportional pressure control valve 1504 and the proportional flow control valve 1508. Additionally, a pressure transducer 1536 may be in fluid communication with, and located in the fluid path between, the fuel shut-off valve 1506 and the proportional flow control valve 1508. The embodiment depicted in FIG. 15 also includes a mixer 1518 in fluid communication with the proportional flow control valve 1508. Further, an engine control module ("ECM") 1520 is electrically connected to the proportional pressure control valve 1504, the fuel shut-off valve 1506, the pressure transducer 1536, and the proportional pressure control valve 1508. The ECM 1520 may be utilized to control the operation of the proportional pressure control valve 1504, the proportional flow control valve 1508, and the fuel shut-off valve 1506.

The embodiments of a fuel flow control system disclosed above have decreased complexity relative to conventional systems and eliminate costly low-leakage requirements of a flow control valve. Removing the low-leakage requirements from the flow control valve improves the reliability of the flow control valve by nature of the material and construction methods available to manufacture the flow control valve to less stringent leakage requirements.

Fuel systems including natural gas fuel systems often use a single, precise fuel metering valve to achieve the required fuel flow accuracy over a given flow range. However, it is desirable to expand the flow operating range of engines and to increase the fueling accuracy and/or resolution within that range. Indeed, inadequate control accuracy, resolution, or flow range can adversely affect or limit abilities to achieve desired fuel economy, engine emission control, engine idle performance, or maximized operating range. This is particularly true when the engine is at low or idle flow ranges. Therefore, there is a need for a fuel flow system that allows for precise fuel metering when an engine is in a low or idle range and when the engine is operating at a higher range. It should be appreciated that embodiments of the present disclosure may be described in terms to flow accuracy and/or flow resolution. For the purposes of the present disclosure accuracy in terms of flow and/or fuel flow will refer to the ability of a particular valve, apparatus or system to allow exact flow and/or fuel flow rates. In other words, a valve, apparatus or system will have low accuracy when the valve, apparatus or system has high rates of error in allowing or providing a given particular flow rate. A valve, apparatus, or system will have high accuracy when the valve, apparatus or system has low rates of error in allowing or providing a given particular flow rate. For the purposes of the present disclosure resolution refers to the size of the changes in flow rates that a particular valve, apparatus or system may be capable of producing. In other words, a valve, apparatus or system will have high resolution when it can provide fine or small incremental increases or decreases in flow. A valve, apparatus or system will have low resolution when it can only provide large incremental increases or decreases in flow.

Embodiments of the present disclosure provide a fuel flow system, method and apparatus that includes a fuel shut-off valve, a pressure regulator, a flow control valve and an injector. Embodiments include the fuel injector being positioned in parallel to a flow control valve (e.g., proportional flow control valve) in order to obtain fine metering fuel flow control when the engine is in idle or near idle positions. Fine metering at idle is difficult to achieve with a single proportional valve. Embodiments provide that the use of an injector improves fuel flow accuracy when the engine is idling or is in near idling condition. It can also extend the operating fuel range of the system at high levels. Embodiments provide that an injector valve is operable to increase or decrease the fuel flow to the engine or air/fuel mixer throughout the flow range of the system. Embodiments provide that the injector valve is operable to increase flow resolution to the engine or air/fuel mixer when the engine is operating at higher ranges. This can thus reduce requirements on the ability to have very fine incremental control over the flow that is allowed to pass through the flow control valve.

Embodiments provide that the injector valve is operable to provide a fuel flow throughout the entire flow range. This can reduce the requirements on the need to have very fine flow control of the flow control valve or proportional flow control valve. Embodiments also provide that the injector valve is operable to provide fuel flow only during a portion of the entire flow range of the system. Embodiments provide that in practice, the flow control valve will remain in the closed configuration up to a predetermined flow. The injector valve will be used to provide a fuel flow up to the predetermined flow. Once the fuel flow from the injector reaches the predetermined flow, the flow control valve can be placed into incremental open configurations to allow a flow through the flow control valve. The use of the injector valve for precise flow control can be utilized at any flow desired between the idle flow and the maximum flow predetermined. Thus, embodiments of the present disclosure provide a system that will decrease the cost of a flow control valve and increase system value by offering technology which enables expanded flow range capability, finer flow rate control resolution within the flow range, and higher accuracy metering at low flow conditions.

Embodiments of the present disclosure provide for the use of an injector valve during idling of the engine as opposed to a single flow control valve. Embodiments thus eliminate the need for a single precise flow control valve that can perform throughout the entire flow range of the engine. Embodiments utilize an injector valve for flow trimming throughout the flow range for higher resolution flow control. In other words, embodiments of the present disclosure provide an injector valve operable to make fine incremental flow adjustments (e.g., small increases or decreases) to the amount of fuel that flows through the injector. Embodiments provide that the injector is operable to function at least at 20 Hz and can change its duty cycle in 0.01% increments. In other words, the injector is operable to alter its cycle of opening and closing in 0.01% increments with respect to the current duty cycle.

Figure 16:
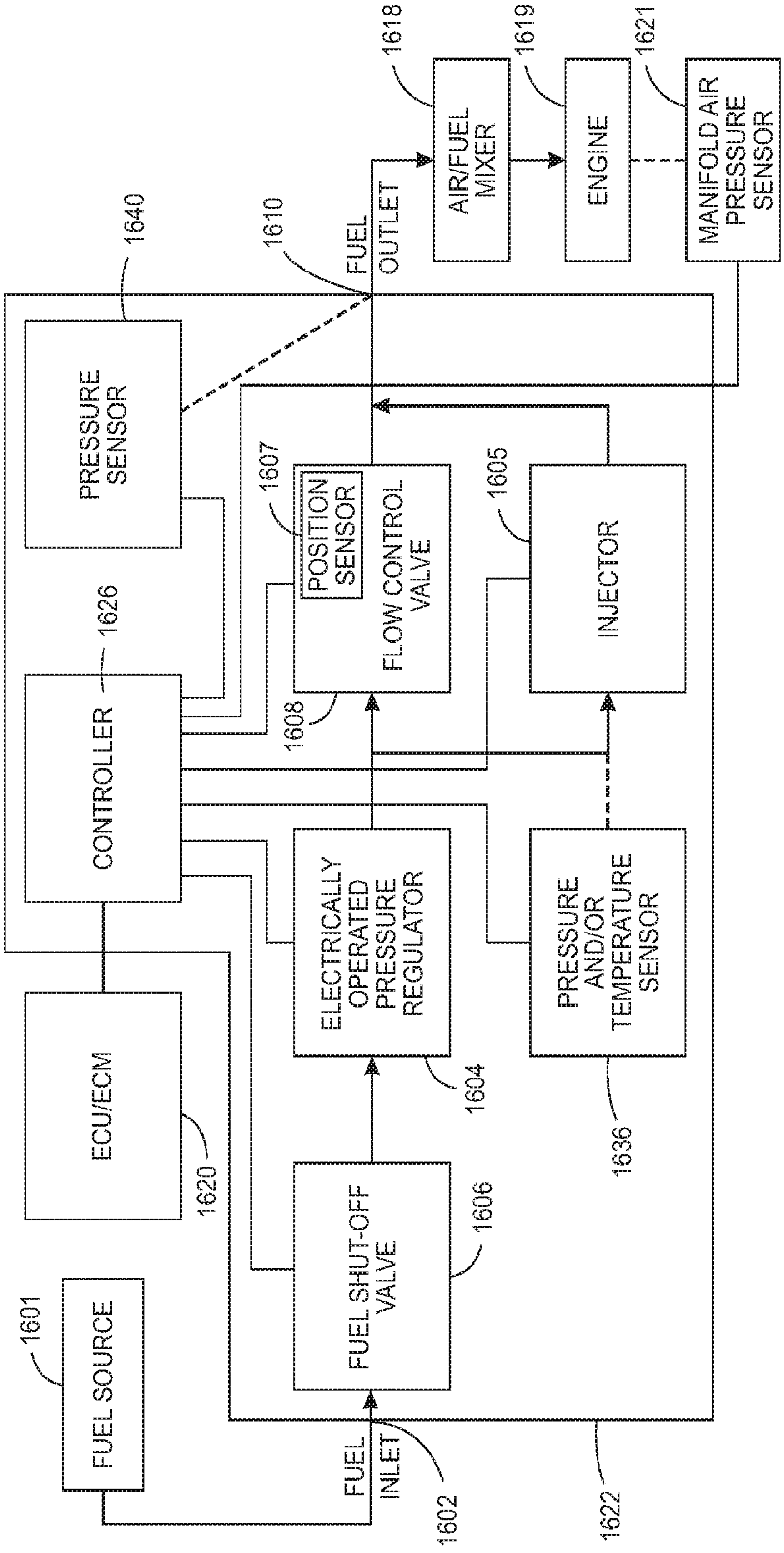
FIG. 16 is schematic block diagram of an exemplary fuel flow apparatus suitable for performing exemplary embodiments of the present disclosure.

Referring to FIG. 16, shown is a schematic block diagram of an exemplary fuel flow apparatus 1600 suitable for performing exemplary embodiments of this disclosure. Shown in FIG. 16 is a fuel inlet 1602 to manifold 1622, a fuel shut-off valve 1606, a pressure regulator 1604, a flow control valve 1608, an optional regulator 1603 (shown in FIG. 21), an injector 1605 and a fuel outlet 1610. The fuel shut-off valve 1606, pressure regulator 1604, flow control valve 1608, optional regulator 1603 and injector 1605 are all fully or at least partially maintained in manifold 1622. The fuel inlet 1602 is fluidly connected to a fuel source 1601 such that is operable to receive a flow of fuel from a fuel source 1601. The fuel outlet 1610 is fluidly connected to an air/fuel mixer 1618 and is operable to provide fuel into a combustion engine 1619 or other type of engine. A manifold air pressure sensor (MAP) 1621 is operably coupled to engine 1619 such that it can sense the air pressure within engine 1619. MAP 1621 is electrically coupled to controller 1626 such that controller 1626 can receive the sensed air pressure information from MAP 1621.

The fuel shut-off valve 1606 is fluidly connected to receive the flow of fuel from the fuel inlet 1602. The fuel shut-off valve 1606 is operable in two configurations (also known as states). The first configuration (or state) allows the flow of fuel from the fuel inlet 1602 to pass through it (i.e., the open configuration or state). The second configuration prevents the flow of fuel to pass through it (i.e., the closed configuration or state). In one embodiment, the fuel shut-off valve 1606 is an ON/OFF flow control valve. It should be appreciated that embodiments of apparatus 1600 are operable such that motoring of engine 1619 can occur while the fuel shut-off valve 1606 is in the closed or second configuration. In other words, embodiments of apparatus 1600 allow engine 1619 to continue to operate and to receive the balance of the flow of fuel in apparatus 1600 (i.e., the amount of fuel located downstream from the fuel shut-off valve 1606) even when the fuel shut-off valve 1606 is in the closed or second configuration. The pressure regulator 1604 is fluidly connected to receive the flow of fuel from the fuel shut-off valve 1606. The pressure regulator 1604 is operable to maintain the flow of fuel to the flow control valve 1608 and/or the injector 1605 at a predetermined pressure. In other words, the pressure of the flow of fuel received by the flow control valve 1608 and/or the injector 1605 is determined by the pressure regulator 1604. Embodiments of the pressure regulator 1604 are operable to maintain a flow of fuel to the flow control valve 1608 and/or the injector 1605 at any pressure(s) between 15 to 150 psia.

The flow control valve 1608 is fluidly connected to receive the flow of fuel from the pressure regulator 1604. The flow control valve 1608 is also fluidly connected to the fuel outlet 1610 such that the fuel outlet 1610 can receive the flow of fuel from the flow control valve 1608. The flow control valve 1608 is operable to incrementally allow the flow of fuel to pass to the fuel outlet 1610. In one embodiment, the flow control valve 1608 is one of a proportional valve or a proportional solenoid valve. It should be appreciated that embodiments include flow control valve 1608 having a position sensor 1607. The position sensor 1607 is operable to sense the position of the valve 1608 (e.g., fully open position, partially open position(s), closed position, etc.). Position sensor 1607 is in communication with controller 1626 such that controller 1626 can receive the sensed position data of position sensor 1607. Additionally, controller 1626 is operable to control the functionality and/or monitor the position of position sensor 1607. As depicted in FIG. 16, the injector 1605 is located in parallel to the flow control valve 1608 such that the flow of fuel from the pressure regulator 1604 can go to both flow control valve 1608 and the injector 1605. The injector 1605 is thus fluidly connected to receive the flow of fuel from the pressure regulator 1604. The injector 1605 is fluidly connected to the fuel outlet 1610 such that the fuel outlet 1610 can receive the flow of fuel from the injector 1605. In one embodiment, the injector 1605 is an ON/OFF gas port injector.

Figure 20:
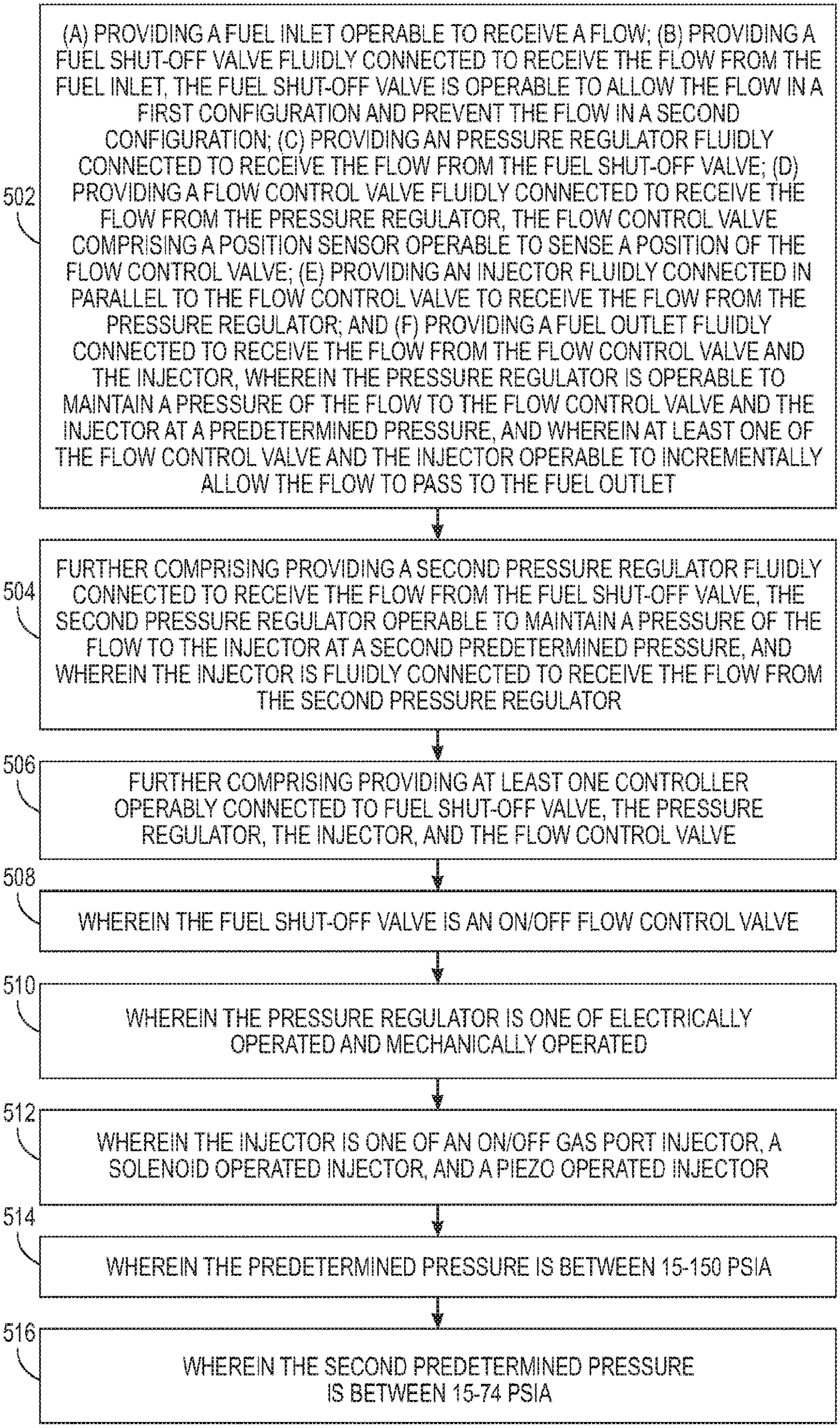
FIG. 20 is a logic flow diagram in accordance with a method, apparatus and system for performing exemplary embodiments of the present disclosure.
Figure 21:
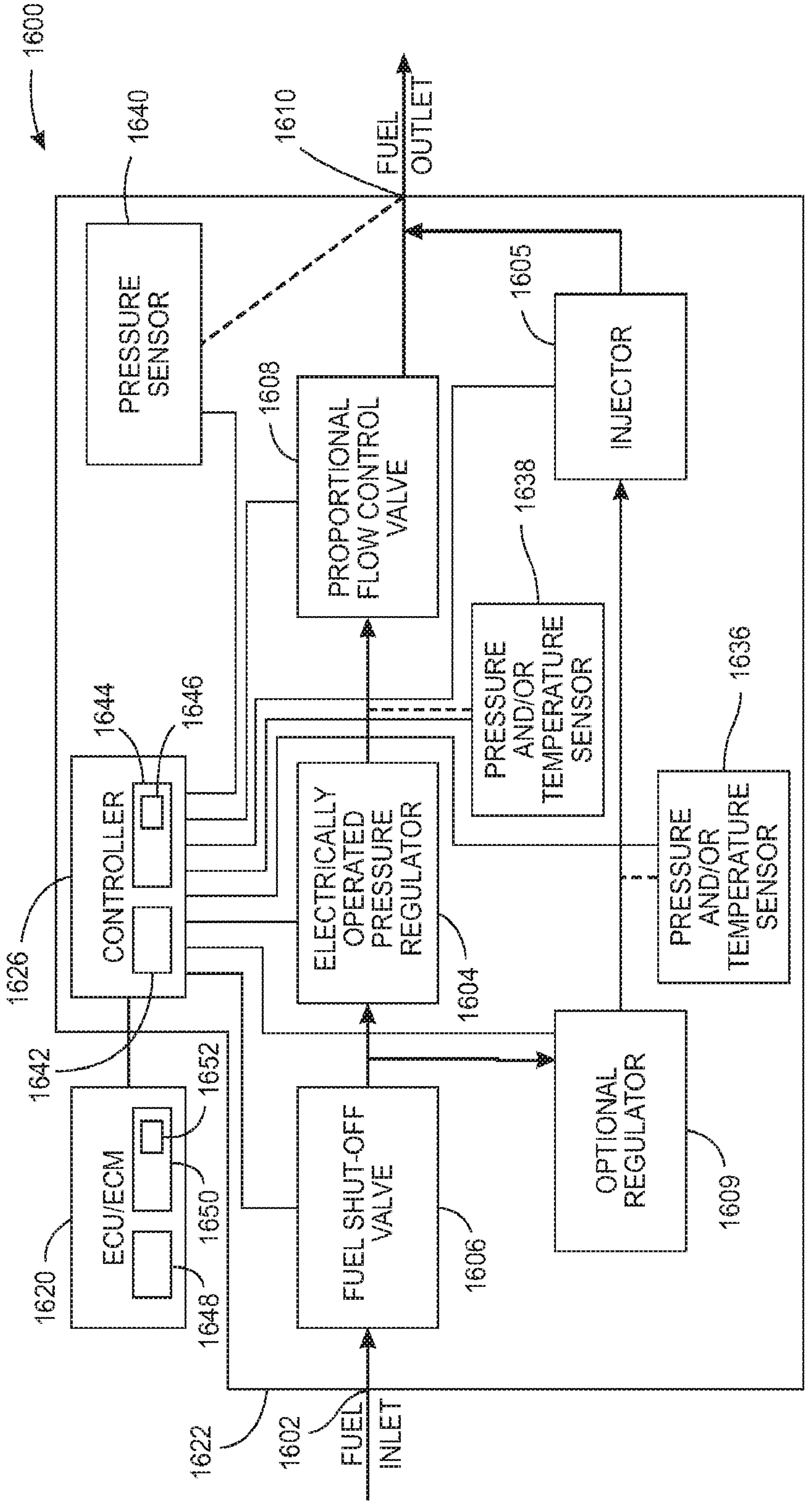
FIG. 21 is another schematic block diagram of an exemplary fuel flow apparatus suitable for performing exemplary embodiments of the present disclosure.

Referring to FIG. 21, shown is the embodiment of the apparatus depicted in FIG. 21 along with an additional optional second regulator 1609 that is fluidly connected to receive the flow of fuel from the fuel shut-off valve 1606. In the embodiment depicted in FIG. 21, a flow of fuel from the fuel shut-off valve 1606 flows to both the optional second regulator 1609 that is positioned in parallel to the electrically operated pressure regulator 1604. The optional second regulator 1604 is operable to maintain the pressure of the flow of fuel that is received by the injector 1605 at a predetermined level. As depicted, the optional second regulator 1609 is located in parallel to the electrically operated pressure regulator 1604 such that the fuel shut-off valve 1606 provides a flow of fuel to either the electrically operated pressure regulator 1604 alone (in the embodiment shown in FIG. 16 in which there is no optional pressure regulator 1609) or to both the electrically operated pressure regulator 1604 and the optional second pressure regulator 1609 (shown in FIG. 21). The optional second regulator 1609 is fluidly connected to the injector 1605 and is operable to provide a flow of fuel to the injector 1605 at a second predetermined pressure. In one embodiment, the second predetermined pressure is between 15 to 74 psia. It should be appreciated that embodiments include the pressure regulator 1604 and the second optional pressure regulator 1609 providing a flow of fuel at the same predetermined pressure. In other words, the predetermined pressure is the same as the second predetermined pressure. In another embodiment, the electrically operated pressure regulator 1604 and the optional second regulator 1609 provide a flow of fuel at different predetermined pressures. In other words, the predetermined pressure is different from the second predetermined pressure. Also shown in FIG. 21 is a secondary pressure and/or temperature sensor 1636 fluidly connected between optional pressure regulator 1609 and the injector 1605. Embodiments of pressure and/or temperature sensor 1636 are operable to sense the temperature and/or the pressure of the flow of fuel that is received by the injector 1605. Pressure and/or temperature sensor(s) are operably connected to the controller 1626 such that controller 1626 can monitor the pressure and/or temperature sensed by sensor 1636. Controller 1626 is also operable to receive the sensed pressure and/or temperature data from pressure and/or temperature sensor(s) 1638, 1640. Pressure sensor 1640 is operably to sense the pressure of the flow of fuel that flows through or is received by fuel outlet 1610. Pressure and/or temperature sensor 1636 is operable to sense (i) the pressure, (ii) the temperature, or (ii) the pressure and temperature of the flow of fuel received by injector 1605. It should be appreciated that direction of flow of fuel is indicated by the arrows in FIGS. 16-21. The lines in dotted line indicate that there is no flow of fuel, but location of a particular element or device. In the embodiment illustrated in FIG. 21, the apparatus includes an optional second regulator 1609 and the injector 1605 will not receive any flow of fuel from the electrically operated pressure regulator 1604, but will only receive a flow of fuel from the fuel shut-off valve 1606.

The controller 1626 depicted in FIGS. 16 and 21 is operably coupled to the fuel shut-off valve 1606, pressure regulator 1604, flow control valve 1608, optional second regulator 1609 (only in the embodiment in which the optional second regulator is present and is electrically operated) and the injector 1605. The controller 1626 is operable to control the functions of each of the elements to which it is coupled. Embodiments of a controller 1626 include at least one processor 1642 and at least one memory 1644 storing computer program instructions 1646 such that execution of the computer program instructions 1646 by the processor 1642 cause the apparatus 1600 to function as described herein. Embodiments of the ECU 1620 each include at least one processor 1648 and at least one memory 1650 storing computer program instructions 1652 such that execution of the computer program instructions 1652 by the processor 1648 cause the apparatus 1600 to function as described herein. Embodiments include the apparatus having one or more controllers 1626 operable to control some or all of the elements of the apparatus 1600 depicted in FIGS. 16 and 21. The electronic controller 1626 is operably and electrically coupled to ECU 1620 such that it can receive communications for required flow demand from the engine control unit (ECU) 1620 of the engine 1619 or internal combustion engine. It should be noted that the controller 1626 may or may not be connected to all elements of the system depicted in FIGS. 16 and 21. Embodiments include the ECU 1620 are operable to control one or more of the elements depicted in FIGS. 16 and 21. Embodiments include the ECU 1620 being operably coupled to each of the elements of the apparatus 1600 such that the ECU 1620 can control those elements without the need of a controller 1626. For example, the fuel shut-off valve 1606 can be controlled by the ECU 1620 directly rather than by the controller 1626. In addition, the second regulator 1609 can be a non-electrically operated regulator such that it does not need to be controlled by the controller 1626. In other words, embodiments of second regulator 1609 can be mechanically operated such that it maintains a predetermined pressure flow of fuel to injector 1605 by mechanical related means (e.g., spring pressure). Controller 1626 is operable to control the flow from the fuel shut-off valve 1606, adjust the outlet pressure of the electrically operated pressure regulator 1604, the position and the flow of the flow control valve 1608, the outlet pressure of the optional second pressure regulator 1609 and the flow of the injector 1605 in response to sensed temperature and pressure data from the sensors 1636, 1638, 1640. Specifically, the controller 1626 and/or ECU 1620 is operable to monitor fluid pressure and temperature of the flow received by the flow control valve 1608 and/or the injector 1605. In order to adjust the flow at different operating conditions of the engine 1619, the controller 1626 is operable to determine the flow output from the flow control valve 1608 based on the position of the flow control valve 1608, the pressure of the flow to the flow control valve 1608, fluid temperature, and fuel outlet pressure. The controller 1626 is operable to adjust the flow control valve 1608 position to increase or decrease the flow exiting the flow control valve 1608. In addition, the controller 1626 is operable to adjust the injector 1605 duty cycle (i.e., the rate at which the injector valve is moved to the open and closed position) to control flow to a predetermined value. The controller 1626 is also operable to adjust the regulated pressure to the flow control valve 1608 and, if required, the injector 1605 to achieve the desired flow rate.

Figure 17:
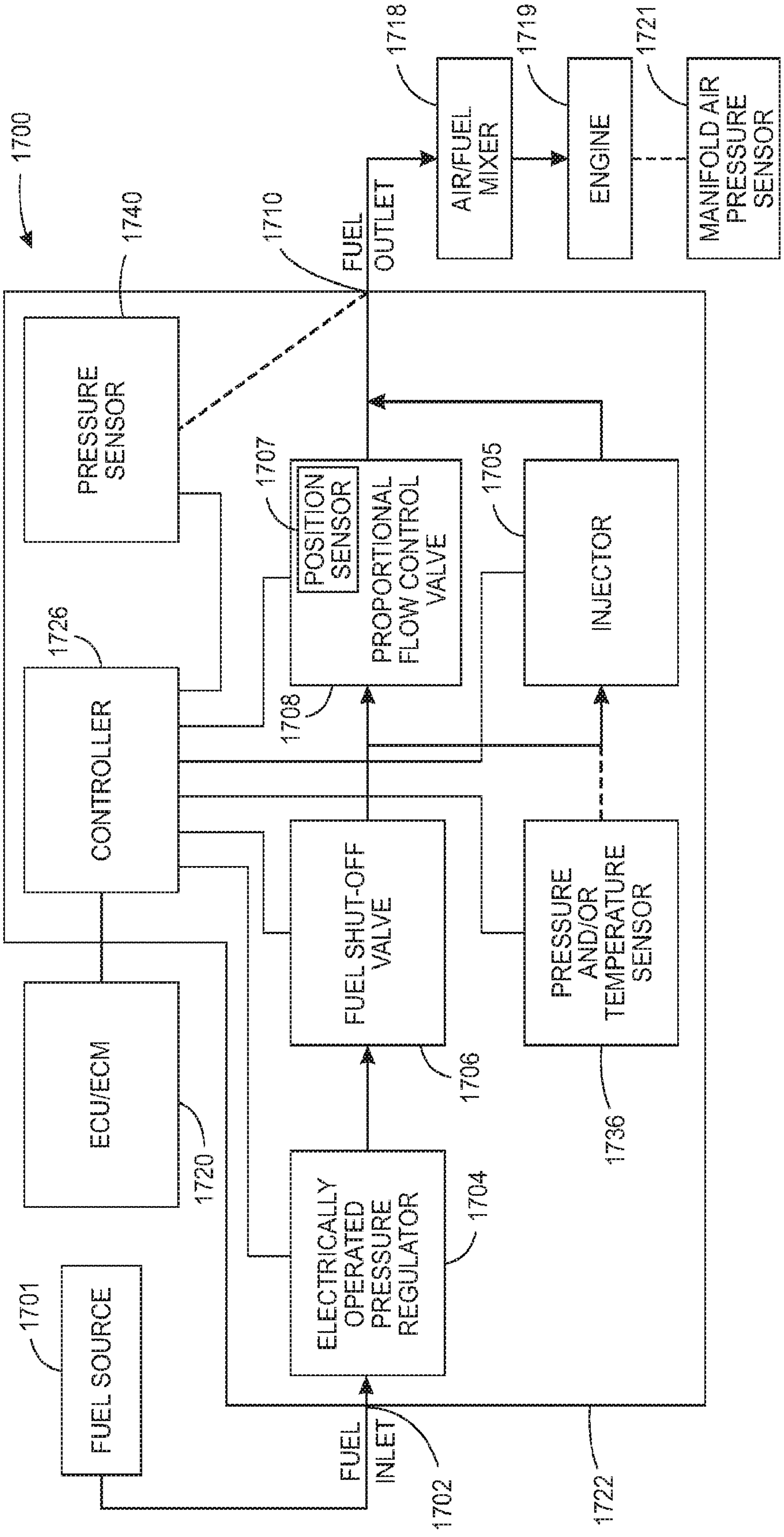
FIG. 17 is an alternative schematic block diagram of an exemplary fuel flow apparatus suitable for performing exemplary embodiments of the present disclosure.

Referring to FIG. 17, shown is an alternative schematic block diagram of an exemplary fuel flow apparatus 1700 suitable for performing exemplary embodiments of the present disclosure. Illustrated in FIG. 17 is manifold 1722, a fuel inlet 1702, an electrically operated pressure regulator 1704, a fuel shut-off valve 1706, a proportional flow control valve 1708, an injector 1705 and a fuel outlet 1710. The electrically operated pressure regulator 1704 is operable to receive a flow of fuel from the fuel inlet 1702. Embodiments of an electrically operated pressure regulator 1704 include any type of electrically operated pressure regulators 1704, solenoid operated pressure regulators, proportional solenoid operated pressure regulators, voice coil operated pressure regulators, moving magnet operated pressure regulators, and/or motor operated pressure regulators. It should be appreciated that embodiments include the electrically operated pressure regulator 1704 being a mechanical pressure regulator. In the embodiment that includes a mechanical pressure regulator, the mechanical pressure regulator is not controlled by the controller 1726 or the ECU 1720. Rather, the mechanical pressure regulator is calibrated to independently maintain a predetermined pressure of the fluid through the use of spring or other pressure setting device, which allows pressure to be maintained downstream up to a predetermined threshold at which point the pressure regulator will close to prevent the pressure from increasing above the predetermined threshold. The fuel-shut off valve 1706 is fluidly connected downstream from the pressure regulator 1704 (including electrically operated or mechanically operated). It should be appreciated that downstream refers to elements located in the direction of the arrows, and upstream refers to elements located opposite the direction of the arrows. Fuel shut-off valve 1706 is operable to receive the flow of fuel from the electrically operated pressure regulator 1704. The proportional flow control valve 1708 is fluidly connected downstream from the fuel shut-off valve 1706 and is operable to receive the flow of fuel from the fuel shut-off valve 1706. The proportional flow control valve 1708 is fluidly connected upstream from the fuel outlet 1710 such that it is operable to provide a flow of fuel to the fuel outlet 1710. The injector 1705 is fluidly connected downstream from the fuel shut-off valve 1706 in parallel to the proportional flow control valve 1708. Accordingly, the fuel shut-off valve 1706 is operable to provide a flow of fuel to both the proportional flow control valve 1708 and the injector 1705. The injector 1705 is fluidly connected upstream from the fuel outlet 1710 such that the injector 1705 is operable to provide a flow of fuel to the fuel outlet 1710.

Also shown in FIG. 17 is pressure and/or temperature sensor 1736 fluidly connected downstream from fuel shut-off valve 1706 and upstream from the injector 1705 and proportional flow control valve 1708. Embodiments of pressure and/or temperature sensor 1736 are operable to sense the pressure and/or temperature of the flow received by the injector 1705 and proportional flow control valve 1708. Pressure and/or temperature sensor 1736 is further operably connected to the controller 1726 such that it can be monitored by the controller 1726 and send its sensed pressure and temperature information to the controller 1726. Another optional pressure sensor 1740 is fluidly connected downstream from proportional flow control valve 1708 and the injector 1705, and upstream from the fuel outlet 1710. Optional pressure sensor 1740 is operable to sense the pressure the flow received by the fuel outlet 1710. Optional pressure sensor 1740 is operably connected to the controller 1726 such that it can be monitored by the controller 1726 and send its sensed pressure information to the controller 1726.

Also shown in FIG. 17 is a controller 1726. The controller 1726 is operably coupled to the electrically operated pressure regulator 1704, the fuel shut-off valve 1706, proportional flow control valve 1708, and the injector 1705. The controller 1726 is operable to control the functions of each of the elements to which it is coupled. Embodiments include the apparatus 1700 having one or more controllers 1726 operable to control some or all of the elements of the apparatus depicted in FIG. 17. It should be appreciated that the controller 1726 receives flow instructions from the ECU 1720 of the internal combustion engine 1719. Controller 1726 is operable to control or adjust the flow from the fuel shut-off valve 1706, the pressure of the flow of fuel from the pressure regulator 1704, the flow of the fuel from flow control valve 1708, and the flow of the fuel from the injector 1705 in response to sensed temperature and pressure data from the sensors 1736, 1740. In another embodiment controller 1726 may not control all of the elements shown in FIG. 17 but will only control a portion of the elements. In this embodiment, the ECU 1720 can be operably coupled to the elements shown in FIG. 17 such that it can directly and independently control those elements. A manifold air pressure sensor (MAP) 1721 is operably coupled to engine 1719 such that it can sense the air pressure within engine 1719. MAP 1721 is electrically coupled to controller 1726 such that controller 1726 can receive the sensed air pressure information from MAP 1721.

The controller 1726 is operable to monitor fluid temperature and pressure of the flow received by the flow control valve 1708 and/or the injector 1705 and/or the pressure of fluid exiting the flow control valve 1708 and the injector 1705. In order to adjust or change the flow at different operating conditions, the controller 1726 is operable to determine the flow output from the flow control valve 1708 based on the position of the flow control valve 1708, the pressure of the flow received by the flow control valve 1708, fluid temperature of flow received by the flow control valve 1708, and pressure of the flow at the fuel outlet 1710. The controller 1726 is operable to adjust or change the flow control valve 1708 position to increase or decrease the flow exiting the flow control valve 1708. In addition, the controller 1726 is operable to adjust or change the injector 1705 duty cycle to control the flow to the predetermined value. The controller 1726 is also operable to adjust the pressure of the flow received by the flow control valve 1708 and/or the injector 1705 as desired.

Figure 18:
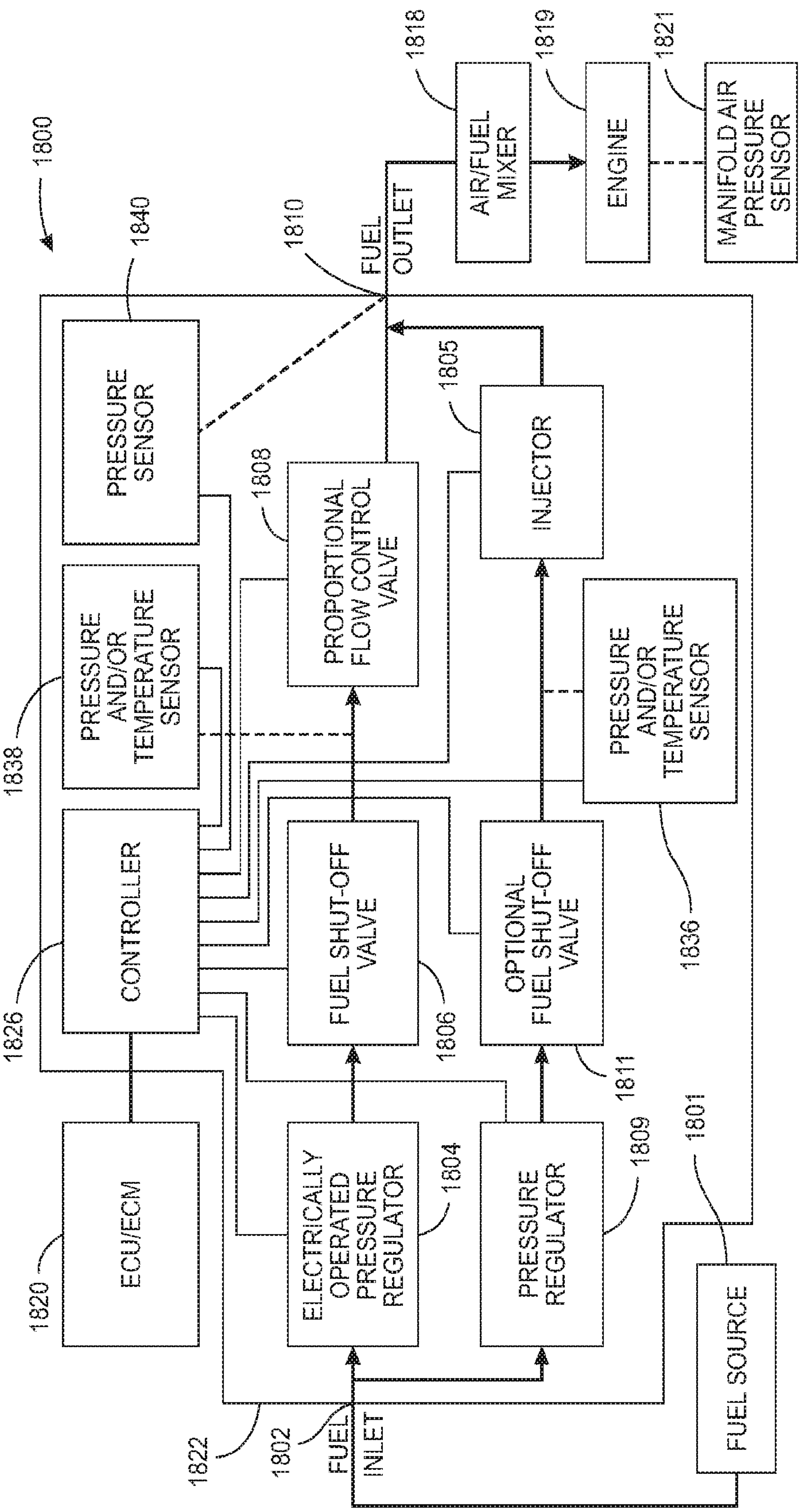
FIG. 18 is yet another alternative schematic block diagram of an exemplary fuel flow apparatus suitable for performing exemplary embodiments of the present disclosure.

Reference is now made to FIG. 18, which illustrates yet another alternative schematic block diagram of an exemplary fuel flow apparatus 1800 suitable for performing exemplary embodiments of the present disclosure. Shown in FIG. 18 is manifold 1822, electrically operated pressure regulator 1804, a fuel shut-off valve 1806, a proportional flow control valve 1808, a pressure regulator 1809, an optional fuel shut-off valve 1811, and an injector 1805. Electrically operated pressure regulator 1804, fuel shut-off valve 1806 and proportional flow control valve 1808 are configured similar to the arrangement found in FIG. 17, however, fuel shut-off valve 1806 is only operable to provide a flow of fuel to proportional flow control valve 1808. Fuel shut-off valve 1806 is not operable to provide a flow of fuel to the injector 1805. Rather, pressure regulator 1809 is disposed in parallel to the electrically operated pressure regulator 1804 to receive a flow of fuel from the fuel inlet 1802. The optional fuel shut-off valve 1811 as shown is disposed intermediate the injector 1805 and downstream from the pressure regulator 1809 to receive the flow of fuel from the pressure regulator 1809. The injector 1805 is disposed downstream from the pressure regulator 1809 and optional fuel shut-off valve 1811 such that injector 1805 can receive a flow of fuel directly from pressure regulator 1809 (in the embodiment that optional fuel shut-off valve 1811 is not present) or from optional fuel shut-off valve 1811 (in the embodiment in which optional fuel shut-off valve 1811 is present). It should be appreciated that even though FIG. 18 depicts the optional fuel shut-off valve 1811 being located between the pressure regulator 1809 and the injector 1805, embodiments include the optional fuel shut-off valve 1811 being disposed between the fuel inlet 1802 and the pressure regulator 1809.

Also shown in FIG. 18 is optional pressure and/or temperature sensor 1838 fluidly connected downstream from fuel shut-off valve 1806 and upstream from the proportional flow control valve 1808. Embodiments of pressure and/or temperature sensor 1838 are operable to sense the pressure and/or temperature of the flow received by the proportional flow control valve 1808. Pressure and/or temperature sensor 1838 is further operably connected to the controller 1826 such that it can be monitored by the controller 1826 and send its sensed pressure and temperature information to the controller 1826. Another optional pressure sensor 1840 is fluidly connected downstream from proportional flow control valve 1808. Optional pressure sensor 1840 is operable to sense the pressure the flow received by the fuel outlet 1810. Optional pressure sensor 1840 is operably connected to the controller 1826 such that it can be monitored by the controller 1826 and send its sensed pressure information to the controller 1826. A manifold air pressure sensor (MAP) 1821 is operably coupled to engine 1819 such that it can sense the air pressure within engine 1819. MAP 1821 is electrically coupled to controller 1826 such that controller 1826 can receive the sensed air pressure information from MAP 1821. It should be appreciated that the sensed air pressure from MAP 1821 can be communicated to controller 1826 if optional pressure sensor 1840 is not utilized in this embodiment. Optional pressure and/or temperature sensor 1836 is operably connected to controller 1826 such that the sensed pressure and/or temperature information of the flow of fuel received by the injector 1805 can be transmitted to the controller 1826.

Figure 19:
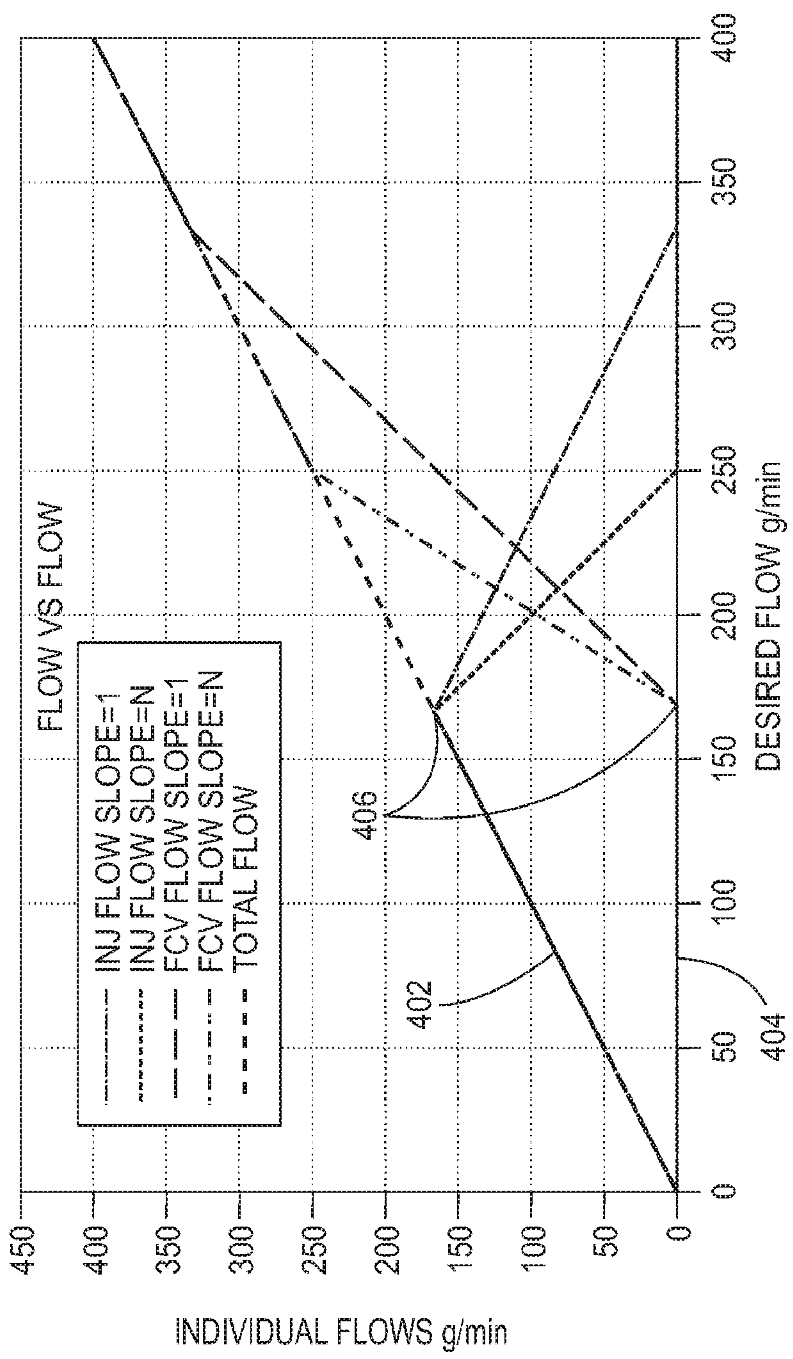
FIG. 19 is a graph illustrating flow of elements of an apparatus or system in accordance with performing exemplary embodiments of the present disclosure.

In practice, when an engine 1819 is first started the engine 1819 is in idle. In this configuration, the proportional flow control valve 1808 will be in the closed position such that no flow of fuel is received by the fuel outlet 1810 from the proportional flow control valve 1808. This is illustrated in the graph of FIG. 19. Fuel flow from the injector 1805 is indicated by line 402, and fuel flow from the flow control valve 1808 is indicated by line 404. While the engine 1819 is in idle, the injector valve 1805 will provide a flow of fuel to the fuel outlet 1810 and the engine 1819. As the engine 1819 begins to increase in speed the proportional flow control valve 1808 will remain closed until a predetermined threshold 406 is reached. Once the predetermined threshold 406 is reached, the proportional flow control valve 1808 will incrementally move from the closed position to different levels of the open position to allow for increasing fuel flow. As the flow of fuel from the proportional control valve 1808 increases, fuel flow from the injector 1805 will decrease. As the engine 1819 continues to speed up, the proportional flow control valve 1808 will continue to open as needed to allow the appropriate flow of fuel to pass to the fuel outlet 1810 and the engine 1819. It should be appreciated that in the example illustrated in FIG. 19 the injector 1805 moves towards the closed position (meaning the operating duty cycle of the injection 1805 is reduced) as the flow control valve 1808 moves towards the open position, embodiments include the injector 1805 valve remaining open (at various duty cycles) as the flow control valve 1808 provides more fuel flow. Embodiments include the ratio of the rate at which the flow control valve 1808 moves towards the open position compared to the rate at which the injector 1805 provides no more flow of fuel is between 1 to 30. In another embodiment the injector 1805 can be utilized to decrease or trim the flow at any location along the flow curve in conjunction with the flow control valve 1808 to improve flow resolution.

Reference is now made to FIG. 20, which depicts a logic flow diagram in accordance with a method, apparatus and system for performing exemplary embodiments of the present disclosure. Block 502 presents (a) providing a fuel inlet operable to receive a flow; (b) providing a fuel shut-off valve fluidly connected to receive the flow from the fuel inlet, the fuel shut-off valve is operable to allow the flow in a first configuration and prevent the flow in a second configuration; (c) providing a pressure regulator fluidly connected to receive the flow from the fuel shut-off valve; (d) providing a flow control valve fluidly connected to receive the flow from the pressure regulator, the flow control valve comprising a position sensor operable to sense a position of the flow control valve; (e) providing an injector fluidly connected in parallel to the flow control valve to receive the flow from the pressure regulator; and (f) providing a fuel outlet fluidly connected to receive the flow from the flow control valve and the injector, wherein the pressure regulator is operable to maintain the flow to the flow control valve and the injector at a predetermined pressure, and wherein at least one of the flow control valve and the injector are operable to incrementally allow the flow to pass to the fuel outlet. Next, block 504 specifies further comprising providing a second pressure regulator fluidly connected to receive the flow from the fuel shut-off valve, the second pressure regulator operable to maintain a pressure of the flow to the injector at a second predetermined pressure, and wherein the injector is fluidly connected to receive the flow from the second pressure regulator.

Following Block 504, block 506 relates to further comprising providing at least one controller operably connected to fuel shut-off valve, the pressure regulator, the injector, and the flow control valve. Block 508 states wherein the fuel shut-off valve is an ON/OFF flow control valve. Then block 510 indicates wherein the pressure regulator is an electrically controlled regulator. Block 512 specifies wherein the injector is an ON/OFF gas port injector. Block 514 states wherein the predetermined pressure is between 15-150 psia. Block 516 states wherein the second predetermined pressure is between 15-74 psia. Finally, block 518 recites further comprising providing a temperature and/or pressure sensor operable to sense a temperature and/or pressure of the flow received by the injector, providing a pressure sensor operable to sense a pressure of the flow at the fuel outlet, and providing a temperature and/or pressure sensor operable to sense a temperature and/or pressure of the flow received by the flow control valve.

The logic diagram of FIG. 20 may be considered to illustrate the operation of a method. The logic diagram of FIG. 20 may also be considered a specific manner in which components of a device that are configured to cause that device to operate, whether such a device is a fuel flow system, a valve or one or more components thereof.

One or more features of the embodiments described herein may be combined to create additional embodiments which are not depicted. While various embodiments have been described in detail above, it should be understood that they have been presented by way of example, and not limitation. It will be apparent to persons skilled in the relevant arts that the disclosed subject matter may be embodied in other specific forms, variations, and modifications without departing from the scope, spirit, or essential characteristics thereof. The embodiments described above are therefore to be considered in all respects as illustrative, and not restrictive. The scope of the invention is indicated by the appended claims, and all changes that come within the meaning and range of equivalents thereof are intended to be embraced therein.

The invention claimed is:

1. A fuel flow control system, the system comprising:

an electrically operated pressure regulator fluidly connected downstream from a fuel inlet;

a fuel shut-off valve fluidly connected downstream from the electrically operated pressure regulator, the fuel shut-off valve operable to allow a flow to pass in a first configuration and to prevent the flow from passing in a second configuration;

a proportional flow control valve fluidly connected downstream from the fuel shut-off valve, the electrically operated pressure regulator, and the fuel inlet, the proportional flow control valve fluidly connected upstream from a fuel outlet, the proportional flow control valve comprising a position sensor operable to sense a position of the flow control valve;

a pressure regulator fluidly connected in parallel to the electrically operated pressure regulator downstream from the fuel inlet;

a second fuel shut-off valve fluidly connected downstream from the pressure regulator and the fuel inlet, the second fuel shut-off valve connected in parallel to the fuel shut-off valve, the electrically operated pressure regulator, and the proportional flow control valve, the second fuel shut-off valve operable to allow a flow to pass in a first arrangement and to prevent the flow from passing in a second arrangement; and an injector fluidly connected downstream from the second fuel shut-off valve and the pressure regulator, the injector connected in parallel to the electrically operated pressure regulator, the fuel shut-off valve, and the proportional control valve, the injector fluidly connected upstream from the fuel outlet, the injector connected in parallel to the proportional flow control valve.

2. The fuel flow control system according to claim 1, the apparatus further comprising an engine control unit and a controller, wherein at least one of the engine control unit and the controller are operably connected to the fuel shut-off valve, the pressure regulator, the injector, and the flow control valve.

3. The fuel flow control system according to claim 1, wherein the pressure regulator is one of electrically operated and mechanically operated.

4. The fuel flow control system according to claim 1, wherein the injector is one of an ON/OFF gas port injector, a solenoid operated injector, and a piezo operated injector.

5. The fuel flow control system according to claim 1, wherein the flow control valve is one of a proportional valve, a proportional solenoid valve, voice coil operated valve, a motor operated valve, a moving magnet operated valve, and a solenoid on/off valve.

6. The fuel flow control system according to claim 1, wherein the pressure regulator is operable to maintain a pressure of the flow at a predetermined pressure is between 15-150 psia.

7. The fuel flow control system according to claim 1, wherein the second pressure regulator is operable to maintain a pressure of the flow at a second predetermined pressure is between 15-74 psia.

8. The fuel flow control system according to claim 1, the apparatus further comprising a pressure and temperature sensor fluidly connected to receive the flow from the second pressure regulator, the pressure and temperature sensor operable to sense a pressure and a temperature of the flow;

a pressure sensor fluidly connected downstream from the flow control valve, the pressure sensor operable to sense a pressure of the flow; and a second pressure and temperature sensor fluidly connected between the pressure regulator and the flow control valve, the second pressure and temperature sensor operable to sense a pressure and a temperature of the flow.

9. The fuel flow control system according to claim 8, wherein the pressure sensor is fluidly connected downstream from the flow control valve and the fuel outlet.

10. The fuel flow control system according to claim 1, the system further comprising an engine control unit and a controller, wherein at least one of the engine control unit and the controller are operable to control the electrically operated pressure regulator, the fuel shut-off valve, the proportional flow control valve, the second fuel shut-off valve, and the injector.

11. The fuel flow control system according to claim 1, wherein the electrically operated pressure regulator is one of electrically operated and mechanically operated.

12. The fuel flow control system according to claim 1, wherein the second fuel shut-off valve is an ON/OFF flow control valve.

13. A method of providing, the method comprising:

(a) providing a fuel inlet operable to receive a flow;

(b) providing a fuel shut-off valve, the fuel shut-off valve is operable to allow the flow in a first configuration and prevent the flow in a second configuration;

(c) providing a pressure regulator fluidly connected to receive the flow from the fuel inlet, the pressure regulator fluidly connected upstream from the fuel shut-off valve;

(d) providing a flow control valve fluidly connected to receive the flow from the fuel shut-off valve, the flow control valve comprising a position sensor operable to sense a position of the flow control valve;

(e) providing a fuel outlet fluidly connected to receive the flow from the flow control valve and the injector, wherein the pressure regulator is operable to maintain a pressure of the flow to the flow control valve and the injector at a predetermined pressure, and wherein at least one of the flow control valve and the injector are operable to incrementally allow the flow to pass to the fuel outlet;

(f) providing a second pressure regulator fluidly connected to receive the flow from the fuel inlet, the second pressure regulator fluidly connected in parallel to the pressure regulator;

(g) providing a second fuel shut-off valve fluidly connected downstream from the second pressure regulator, the second fuel shut-off valve connected in parallel to the fuel shut-off valve, the electrically operated pressure regulator, and the proportional flow control valve, the second fuel shut-off valve operable to allow a flow to pass in a first arrangement and to prevent the flow from passing in a second arrangement; and (h) providing an injector fluidly connected downstream from the second fuel shut-off valve and the pressure regulator, the injector connected in parallel to the electrically operated pressure regulator, the fuel shut-off valve, and the proportional control valve, the injector fluidly connected upstream from the fuel outlet, the injector connected in parallel to the proportional flow control valve.

14. The method according to claim 13, wherein the second pressure regulator is operable to maintain a pressure of the flow to the injector at a second predetermined pressure, and wherein the injector is fluidly connected to receive the flow from the second pressure regulator.

15. The method according to claim 13, the method further comprising providing at least one controller operably connected to fuel shut-off valve, the pressure regulator, the injector, and the flow control valve.

16. The method according to claim 13, wherein the pressure regulator is one of electrically operated and mechanically operated.

* * * * *